(12) United States Patent
Aoki

(10) Patent No.: US 9,871,546 B2
(45) Date of Patent: Jan. 16, 2018

(54) WEARABLE TERMINAL MOUNTABLE ON PART OF BODY OF USER

(71) Applicant: Panasonic Intellectual Property Corporation of America, Torrance, CA (US)

(72) Inventor: Hideshi Aoki, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 15/252,015

(22) Filed: Aug. 30, 2016

(65) Prior Publication Data

US 2017/0077974 A1    Mar. 16, 2017

(30) Foreign Application Priority Data

Sep. 11, 2015 (JP) ................. 2015-179962
Apr. 12, 2016 (JP) ................. 2016-079932

(51) Int. Cl.
*H04B 1/3827* (2015.01)
*H04W 12/06* (2009.01)
*H04B 13/00* (2006.01)
*G06F 1/16* (2006.01)

(52) U.S. Cl.
CPC ............ *H04B 1/385* (2013.01); *G06F 1/163* (2013.01); *H04B 13/005* (2013.01); *H04W 12/06* (2013.01)

(58) Field of Classification Search
CPC ..... H04B 1/385; H04B 13/005; H04W 12/06; G06F 1/163

USPC ........................................ 455/41.1
See application file for complete search history.

(56) References Cited

U.S. PATENT DOCUMENTS

| | | | | |
|---|---|---|---|---|
| 7,236,100 B2* | 6/2007 | Obradovich | ........... | G01C 21/20 340/905 |
| 7,343,165 B2* | 3/2008 | Obradovich | ............ | H04W 4/02 455/456.1 |
| 7,421,334 B2* | 9/2008 | Dahlgren | ............... | G07C 5/008 340/989 |
| 7,542,720 B2* | 6/2009 | Yoda | .................... | H04B 13/005 455/41.1 |

(Continued)

FOREIGN PATENT DOCUMENTS

JP    2010-130669    6/2010

*Primary Examiner* — Hai V Nguyen
(74) *Attorney, Agent, or Firm* — Greenblum & Bernstein, P.L.C.

(57) ABSTRACT

A wearable terminal includes a display input unit which displays an image, which corresponds to a program identical to at least one program stored in another wearable terminal among a plurality of programs stored in a storage unit and is used for starting the program in response to an operation performed thereto, on a display screen based on another terminal program information, which is received in a case where another wearable terminal is authenticated, and receives an operation with respect to the image displayed on the display screen, and a control unit which performs control such that in a case where the display input unit receives an operation with respect to the image, the program corresponding to the image which receives the operation is started and a communication unit is allowed to transmit specific information associated with the program to another wearable terminal.

20 Claims, 13 Drawing Sheets

(56) References Cited

U.S. PATENT DOCUMENTS

| | | | | |
|---|---|---|---|---|
| 8,165,522 B2* | 4/2012 | Park | H04B 13/005 | 340/5.8 |
| 8,237,953 B2* | 8/2012 | Watanabe | G06F 3/1204 | 358/1.13 |
| 8,406,991 B2* | 3/2013 | Ohta | G01C 21/26 | 701/400 |
| 8,593,672 B2* | 11/2013 | Aoyama | G06F 21/34 | 358/1.13 |
| 8,594,568 B2* | 11/2013 | Falck | H04B 13/005 | 340/10.33 |
| 8,631,328 B2* | 1/2014 | Kim | G06F 3/017 | 715/706 |
| 8,850,302 B2* | 9/2014 | Nagao | G06F 17/30843 | 715/211 |
| 8,867,995 B2* | 10/2014 | Kim | H04B 13/005 | 345/163 |
| 8,909,152 B2* | 12/2014 | Yu | H04B 5/00 | 455/41.1 |
| 8,947,226 B2* | 2/2015 | Dugan | A61B 5/02 | 340/10.1 |
| 9,042,971 B2* | 5/2015 | Brumback | A61B 5/02438 | 600/300 |
| 9,081,432 B2* | 7/2015 | Kunioka | G06F 3/041 | |
| 9,123,186 B2* | 9/2015 | Ricci | H04W 48/04 | |
| 9,223,956 B2* | 12/2015 | Hong | G06F 21/32 | |
| 9,288,836 B1* | 3/2016 | Clement | H04W 84/18 | |
| 9,304,000 B2* | 4/2016 | Yamaguchi | G01C 21/20 | |
| 9,439,566 B2* | 9/2016 | Arne | A61B 5/0022 | |
| 9,484,066 B2* | 11/2016 | Ko | G11B 27/034 | |
| 9,578,623 B2* | 2/2017 | Park | H04L 12/185 | |
| 9,594,443 B2* | 3/2017 | VanBlon | G06F 3/03545 | |
| 9,613,591 B2* | 4/2017 | Ryu | G06F 3/1454 | |
| 2004/0152440 A1 | 8/2004 | Yoda | H04B 13/005 | 455/403 |
| 2006/0187203 A1* | 8/2006 | Piraneque | G06F 1/1626 | 345/158 |
| 2009/0124296 A1* | 5/2009 | Tanae | H04M 19/04 | 455/567 |
| 2010/0138149 A1* | 6/2010 | Ohta | G01C 21/26 | 701/533 |
| 2010/0201625 A1* | 8/2010 | Urbach | G06F 3/0338 | 345/163 |
| 2010/0268056 A1* | 10/2010 | Picard | A61B 5/0531 | 600/388 |
| 2011/0007035 A1* | 1/2011 | Shai | G06F 3/014 | 345/179 |
| 2012/0056805 A1* | 3/2012 | Bronner, Sr. | G06F 3/014 | 345/157 |
| 2012/0249419 A1* | 10/2012 | Bronner, Sr. | G06F 3/014 | 345/157 |
| 2012/0306643 A1* | 12/2012 | Dugan | A61B 5/02 | 340/539.12 |
| 2013/0106603 A1* | 5/2013 | Weast | G06F 1/163 | 340/539.11 |
| 2013/0201132 A1* | 8/2013 | Kunioka | G06F 3/041 | 345/173 |
| 2013/0328770 A1* | 12/2013 | Parham | G06F 3/0304 | 345/157 |
| 2014/0051946 A1* | 2/2014 | Arne | A61B 5/0022 | 600/301 |
| 2014/0089672 A1* | 3/2014 | Luna | H04L 9/3231 | 713/186 |
| 2014/0104156 A1* | 4/2014 | Touma | G06F 3/014 | 345/156 |
| 2014/0133383 A1* | 5/2014 | Park | H04L 12/185 | 370/312 |
| 2014/0135631 A1* | 5/2014 | Brumback | A61B 5/02438 | 600/479 |
| 2014/0240103 A1* | 8/2014 | Lake | G08C 17/02 | 340/12.5 |
| 2014/0279528 A1* | 9/2014 | Slaby | H04L 63/0853 | 705/44 |
| 2014/0282878 A1* | 9/2014 | Ignatchenko | H04L 63/08 | 726/3 |
| 2015/0006670 A1* | 1/2015 | Park | G06F 3/011 | 709/217 |
| 2015/0051501 A1* | 2/2015 | Dugan | A61B 5/02 | 600/483 |
| 2015/0100323 A1* | 4/2015 | Kozuka | G06F 3/017 | 704/275 |
| 2015/0149310 A1* | 5/2015 | He | G06Q 20/322 | 705/21 |
| 2015/0202516 A1* | 7/2015 | Yang | 3/92 | |
| 2015/0212702 A1* | 7/2015 | Kim | G06F 3/04842 | 715/838 |
| 2015/0241998 A1* | 8/2015 | VanBlon | G06F 3/03545 | 340/5.61 |
| 2015/0256596 A1* | 9/2015 | Takeuchi | G06Q 30/0241 | 715/748 |
| 2015/0278498 A1* | 10/2015 | Hong | G06F 21/32 | 340/5.82 |
| 2015/0301644 A1* | 10/2015 | Walley | G06F 3/011 | 345/174 |
| 2015/0305690 A1* | 10/2015 | Tan | G08B 21/0446 | 600/301 |
| 2015/0310897 A1* | 10/2015 | Ko | G11B 27/034 | 386/230 |
| 2015/0379251 A1* | 12/2015 | Komaki | G06F 21/32 | 726/19 |
| 2016/0003623 A1* | 1/2016 | Venkatraman | G01C 21/20 | 701/410 |
| 2016/0006850 A1* | 1/2016 | Ohki | H04M 1/7253 | 455/557 |
| 2016/0034679 A1* | 2/2016 | Yun | G06F 1/163 | 340/5.83 |
| 2016/0035135 A1* | 2/2016 | Park | G06T 19/006 | 345/633 |
| 2016/0044232 A1* | 2/2016 | Kim | G02B 13/009 | 348/345 |
| 2016/0044502 A1* | 2/2016 | Jung | H04M 1/7253 | 455/411 |
| 2016/0063954 A1* | 3/2016 | Ryu | G06F 3/1454 | 345/589 |
| 2016/0080154 A1* | 3/2016 | Lee | H04L 9/3234 | 713/185 |
| 2016/0080631 A1* | 3/2016 | Huh | H04N 5/23212 | 348/349 |
| 2016/0098138 A1* | 4/2016 | Park | G06F 3/0416 | 345/173 |
| 2016/0283808 A1* | 9/2016 | Oganezov | G06K 9/00885 | |
| 2017/0010658 A1* | 1/2017 | Tanaka | G06F 1/163 | |
| 2017/0010674 A1* | 1/2017 | Ide | G06F 3/017 | |
| 2017/0034333 A1* | 2/2017 | Vishwanath | H04M 1/72527 | |
| 2017/0041309 A1* | 2/2017 | Ekambaram | G06F 21/64 | |
| 2017/0097715 A1* | 4/2017 | Kim | H04M 1/72583 | |

* cited by examiner

| PROGRAM INFORMATION | ACCOUNT DATA | OTHER DATA | TRANSMISSION PROPRIETY |
|---|---|---|---|
| APPLICATION A | Abcde | PROFILE IMAGE | OK |
| | | PHOTOGRAPH OF ALBUM | OK |
| | | SELF-INTRODUCTION TEXT (TEXT) | NG |
| APPLICATION B | vwxyz | PHONE NUMBER | OK |
| | | E-MAIL ADDRESS | NG |
| | | ADDRESS | OK |
| | | MOVING IMAGE | NG |
| ... | ... | ... | ... |

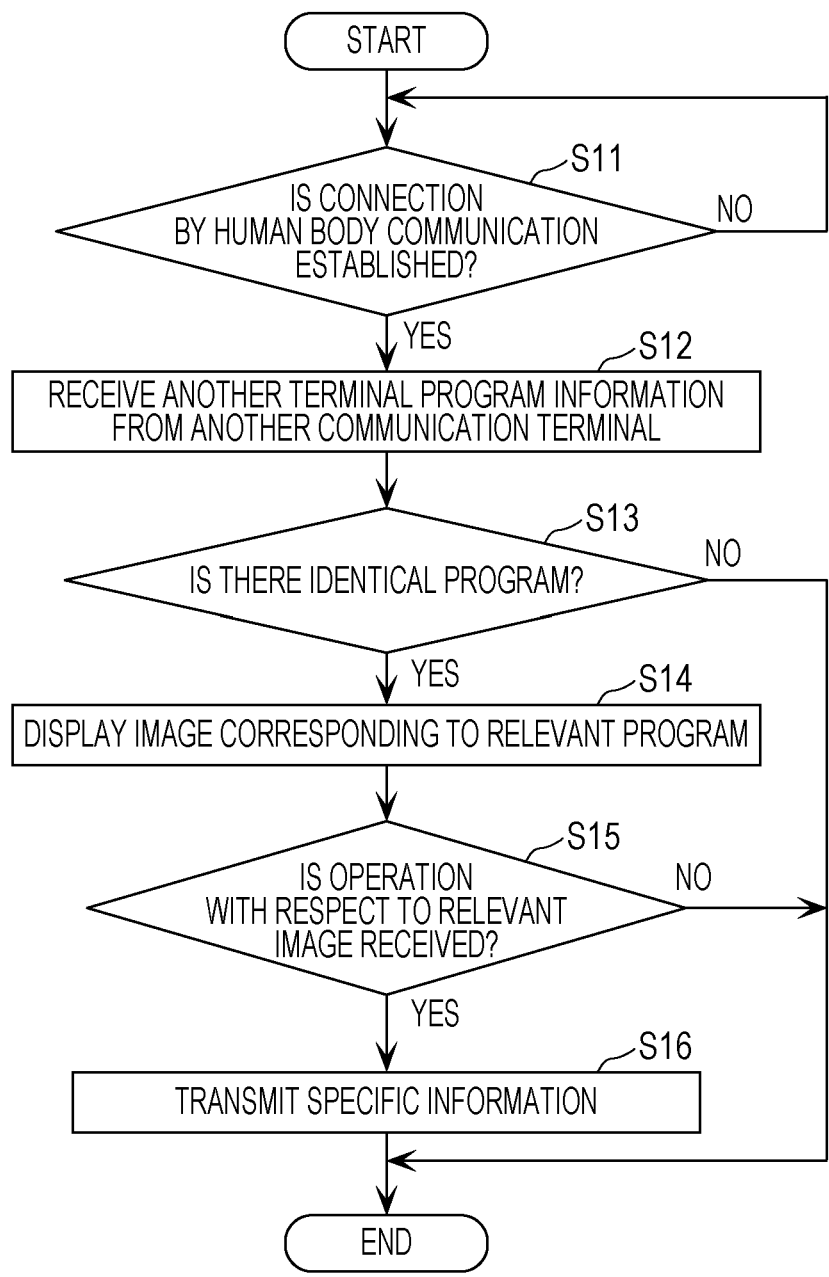

WEARABLE TERMINAL MOUNTABLE ON PART OF BODY OF USER

BACKGROUND

1. Technical Field

The present disclosure relates to a wearable terminal, a communication method thereof, and a medium for storing a program thereof.

2. Description of the Related Art

Wearable terminals which are mountable on a part of a body of a user such as an arm and a head are known. A wearable terminal has a communication function so as to be able to communicate with a communication terminal such as a smartphone.

However, when a wearable terminal communicates with a communication terminal such as a smartphone or another wearable terminal, it is necessary to search a connection destination and perform pairing, for example, so as to establish connection. Therefore, a user needs to perform an operation for performing search or paring with respect to a wearable terminal. Thus, the operation takes time and labor of the user.

For example, a technique for detecting a nearby communication terminal and performing paring is disclosed in Japanese Unexamined Patent Application Publication No. 2010-130669. This technique can eliminate time and labor for performing search of a connection destination and paring when a wearable terminal communicates with a smartphone or another wearable terminal.

SUMMARY

However, even if a nearby communication terminal or the like can be detected to establish communication by using the above-mentioned related art, what type of information can be reciprocated or exchanged with the communication terminal or the like which is a connection destination is not clear. Therefore, a user needs to preliminarily confirm information, which can be reciprocated or exchanged, with another person who possesses a communication terminal or the like which is the connection destination. Further, even if information which can be reciprocated or exchanged can be confirmed, a plurality of operations (an operation including a plurality of steps) such as specifying the confirmed information are required to be performed. That is, even if the technique disclosed in Japanese Unexamined Patent Application Publication No. 2010-130669 is used, such problem still remains that rapid information exchange cannot be performed between a wearable terminal and a communication terminal such as a smartphone or another wearable terminal and accordingly, a user cannot perform natural and simple information exchange.

One non-limiting and exemplary embodiment provides a wearable terminal, a communication method thereof, and a program thereof by which time and labor of a user can be reduced and rapid information exchange can be performed with another wearable terminal.

In one general aspect, the techniques disclosed here feature a wearable terminal which is mountable on a part of a body and includes an authentication unit, a storage unit, a communication unit, a display input unit, and a control unit, in which the authentication unit authenticates another wearable terminal which is different from the wearable terminal, the storage unit stores a plurality of programs which are different from each other, the communication unit communicates with the another wearable terminal so as to receive another terminal program information representing at least one program stored in the another wearable terminal from the another wearable terminal in a case where the another wearable terminal is authenticated by the authentication unit, the display input unit displays an image, which corresponds to a program identical to the at least one program stored in the another wearable terminal among the plurality of programs stored in the storage unit and is used for starting the program in response to an operation performed thereto, on a display screen based on the another terminal program information, which is received by the communication unit, so as to receive an operation with respect to the image which is displayed on the display screen, and in a case where the display input unit receives an operation with respect to the image, the control unit starts the program corresponding to the image which receives the operation and allows the communication unit to transmit specific information associated with the program to the another wearable terminal.

According to the present disclosure, a wearable terminal and the like which are capable of reducing time and labor of a user and performing rapid information exchange with another wearable terminal can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a flowchart illustrating an example of an operation of the wearable terminal according to Example 1;

DETAILED DESCRIPTION

Figure 1:
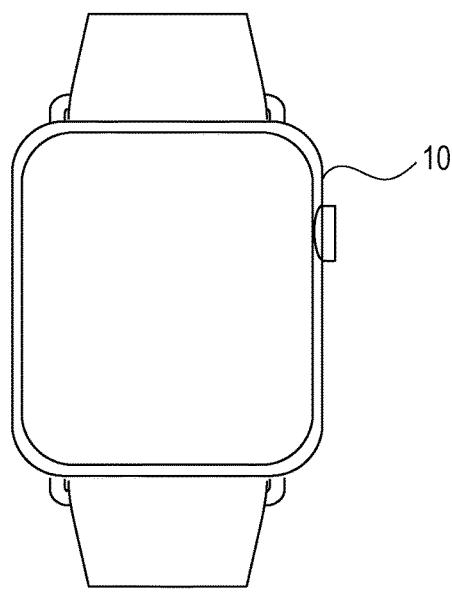
FIG. 1 illustrates an outer appearance example of a wearable terminal according to an embodiment.

A wearable terminal according to an aspect of the present disclosure is mountable on a part of a body and includes an authentication unit, a storage unit, a communication unit, a display input unit, and a control unit, in which the authentication unit authenticates another wearable terminal which is different from the wearable terminal, the storage unit stores a plurality of programs which are different from each other, the communication unit communicates with the another wearable terminal so as to receive another terminal program information representing at least one program stored in the another wearable terminal from the another wearable terminal in a case where the another wearable terminal is authenticated by the authentication unit, the display input unit displays an image, which corresponds to a program identical to the at least one program stored in the another wearable terminal among the plurality of programs stored in the storage unit and is used for starting the program in response to an operation performed thereto, on a display screen based on the another terminal program information, which is received by the communication unit, so as to receive an operation with respect to the image which is displayed on the display screen, and in a case where the display input unit receives an operation with respect to the image, the control unit starts the program corresponding to the image which receives the operation and allows the communication unit to transmit specific information associated with the program to the another wearable terminal.

Accordingly, a user wearing the wearable terminal according to the present aspect can quickly grasp information which can be transmitted (reciprocated or exchanged) with another wearable terminal) to another wearable terminal which is a connection destination and can transmit information with a few operations.

Thus, a user wearing the wearable terminal can perform natural and simple information exchange with a user wearing another wearable terminal.

Further, for example, a body connection unit which connects to a body may be further included, the communication unit may include a first communication unit which communicates with the another wearable terminal by human body communication, which is communication using a human body as a communication medium, via the body connection unit and a second communication unit which communicates with the another wearable terminal by radio communication performed without an intermediary of the body connection unit, and the authentication unit may authenticate the another wearable terminal in a case where connection with the another wearable terminal through the human body communication is established by the first communication unit.

Accordingly, when connection using the human body communication is established, the wearable terminal according to the present aspect and another wearable terminal can be authenticated.

Further, for example, the control unit may allow the second communication unit to transmit the specific information to the another wearable terminal.

Accordingly, the wearable terminal according to the present aspect and another wearable terminal can be authenticated by using the human body communication and after that, the second communication unit can be allowed to transmit (or exchange) specific information.

Further, for example, the control unit may allow the first communication unit to transmit the specific information to the another wearable terminal.

Accordingly, the wearable terminal according to the present aspect and another wearable terminal can be authenticated by using the human body communication and specific information can be transmitted (or exchanged) by using the human body communication.

Further, for example, the control unit may switch the first communication unit and the second communication unit to each other based on an attribute of the specific information and allow the first communication unit or the second communication unit switched to transmit the specific information to the another wearable terminal.

Accordingly, the wearable terminal according to the present aspect and another wearable terminal can be authenticated by using the human body communication and the first communication unit or the second communication unit, which is selected based on an attribute of the specific information, can be allowed to transmit the specific information after that.

Here, for example, the attribute may be data capacity, and the control unit may allow the second communication unit to transmit the specific information to the another wearable terminal in a case where the data capacity of the specific information is equal to or larger than a predetermined value, and allow the first communication unit to transmit the specific information to the another wearable terminal in a case where the data capacity of the specific information is smaller than the predetermined value.

Accordingly, when the data capacity of specific information is large, the specific information can be transmitted by using the second communication unit. While, when the data capacity of specific information is small, the specific information can be transmitted by using the first communication unit whose data transmission capacity is limited.

Further, for example, the attribute may be a data classification, and the control unit may allow the second communication unit to transmit the specific information to the another wearable terminal in a case where the data classification of the specific information is image data, voice data, or moving image data, and allow the first communication unit to transmit the specific information to the another wearable terminal in a case where the data classification of the specific information is account data, profile data, or text data.

Further, for example, the control unit may allow the communication unit to transmit the specific information to the another wearable terminal during connection through the human body communication.

Further, for example, the control unit may allow the first communication unit to transmit a part of the specific information to the another wearable terminal during connection through the human body communication and allow the second communication unit to transmit information of the rest of the specific information to the another wearable terminal after disconnection of the human body communication.

Further, for example, the control unit may allow the second communication unit to transmit information of the rest of the specific information to the another wearable terminal after disconnection of the human body communication and after reception of approval information from the another wearable terminal.

Thus, a part of specific information can be transmitted to another wearable terminal by the human body communication and information of the rest of the specific information can be transmitted by radio communication or the like after reception of approval. Accordingly, a user of another wearable terminal can select acquisition of information of the rest of the specific information based on approval propriety after acquiring a part of the specific information by the human body communication.

Further, for example, the storage unit may store information associated with each of the plurality of programs and transmission propriety of the information, as the specific information, and the control unit may allow the communication unit to transmit the specific information, which is stored as transmittable information by the storage unit, to the another wearable terminal.

Thus, specific information associated with the relevant program is preliminarily set. Accordingly, a user can transmit the specific information associated with the relevant program to another wearable terminal only by performing an operation such as tapping with respect to the displayed image.

Further, for example, the specific information may be at least one of account data, profile data, text data, image data, voice data, and moving image data.

Further, for example, a detection unit which detects a first action with respect to the wearable terminal may be further included, the control unit may receive second action information representing a second action with respect to the another wearable terminal, and the authentication unit may authenticate the another wearable terminal in a case of determination in which the second action represented by the second action information received by the communication unit and the first action detected by the detection unit are an identical action.

Accordingly, the wearable terminal according to the present aspect and another wearable terminal can be authenticated with a simple action such as an inclination action such as bowing, a hugging action, an action for high five, and a gesture action as the first action and the second action.

Further, a communication method according to another aspect of the present disclosure is a communication method for a wearable terminal, for example, which is mountable on a part of a body and in which a plurality of programs which are different from each other are stored in a storage unit, and includes an authentication step for authenticating another wearable terminal which is different from the wearable terminal, a communication step for communicating with another wearable terminal and for receiving another terminal program information representing at least one program stored in the another wearable terminal from the another wearable terminal in a case where the another wearable terminal is authenticated in the authentication step, a display input step for displaying an image, which corresponds to a program identical to the at least one program stored in the another wearable terminal among a plurality of programs stored in the storage unit and is used for starting the program in response to an operation performed thereto, on a display screen based on the another terminal program information, which is received in the communication step, so as to receive an operation with respect to the image which is displayed on the display screen, and a control step for performing control such that in a case where an operation with respect to the image is received in the display input step, the program corresponding to the image which receives the operation is started and specific information associated with the program is transmitted to the another wearable terminal in the communication step.

Here, it should be noted that each embodiment described below illustrates a specific example of the present disclosure. Numerical numbers, shapes, constituent elements, steps, orders of steps, and the like which are described in the embodiment below are examples and do not limit the present disclosure. Further, among constituent elements in the embodiment below, constituent elements which are not described in independent claims which represent the primary concept are explained as arbitrary constituent elements. Further, in the whole embodiment, contents of the embodiment can be mutually combined.

Embodiment

A wearable terminal 10 according to an aspect of the present disclosure will be described below.

[Outer Appearance Example of Wearable Terminal 10]

FIG. 1 illustrates an outer appearance example of the wearable terminal 10 according to this embodiment. FIG. 1 illustrates an outer appearance example of the wearable terminal 10 which serves as a band type (watch type) device.

Here, the wearable terminal 10 is not limited to a band type (watch type) device. The wearable terminal 10 may be a spectacle type device or a head-mount type device. That is, the wearable terminal 10 may be any type of device as long as the wearable terminal 10 is mountable on a part of a body of a user and includes the functional configuration described below.

[Configuration of Wearable Terminal 10]

An example of the hardware configuration of the wearable terminal 10 will be first described with reference to FIG. 2 and then, an example of each functional configuration of the wearable terminal 10 will be described with reference to FIG. 3 below.

Figure 2:
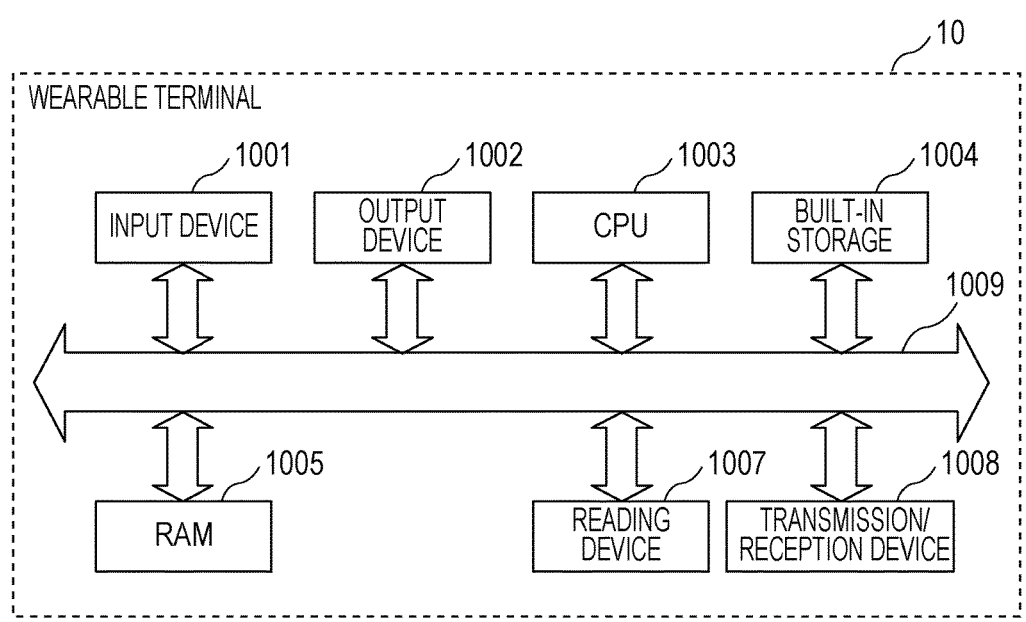
FIG. 2 illustrates an example of the hardware configuration of a computer which realizes functions of the wearable terminal according to the embodiment by software.

FIG. 2 illustrates an example of the hardware configuration of a computer which realizes functions of the wearable terminal 10 according to the present embodiment by software.

The wearable terminal 10 is a computer which includes an input device 1001, an output device 1002, CPU 1003, a built-in storage 1004, a RAM 1005, a reading device 1007, a transmission/reception device 1008, and a bus 1009, as illustrated in FIG. 2. The input device 1001, the output device 1002, the CPU 1003, the built-in storage 1004, the RAM 1005, the reading device 1007, and the transmission/reception device 1008 are mutually connected by the bus 1009.

The input device 1001 serves as a user interface such as an input button, a touch pad, and a touch panel display and receives an operation of a user. Here, the input device 1001 may have the configuration to receive a voice operation and a remote operation by a remote controller or the like as well as a contact operation by a user.

The built-in storage 1004 is a flash memory or the like. In the built-in storage 1004, a program for realizing various functional configurations of the wearable terminal 10 and an application exhibiting functions using various functional configurations of a communication terminal may be preliminarily stored.

The RAM 1005 is a random access memory and is used for storing data and the like in execution of a program and an application.

The reading device 1007 reads information from a recording medium such as a universal serial bus (USB) memory. The reading device 1007 reads a program and an application as those mentioned above from a recording medium, in which the program and the application are recorded, so as to store the program and the application in the built-in storage 1004.

The transmission/reception device 1008 is a communication circuit for performing communication by radio or by wire. The transmission/reception device 1008 communicates with a server device which is connected to the network, for example, and downloads programs and applications as those mentioned above from the server device so as to store the programs and the applications in the built-in storage 1004.

The CPU 1003 is a central processing unit. The CPU 1003 copies programs and applications stored in the built-in storage 1004 on the RAM 1005 and sequentially reads commands included in the programs and the applications from the RAM 1005 so as to execute the programs and the applications.

Various functional constituent elements of the wearable terminal 10 are now described with reference to FIG. 3.

Figures 3, 4:
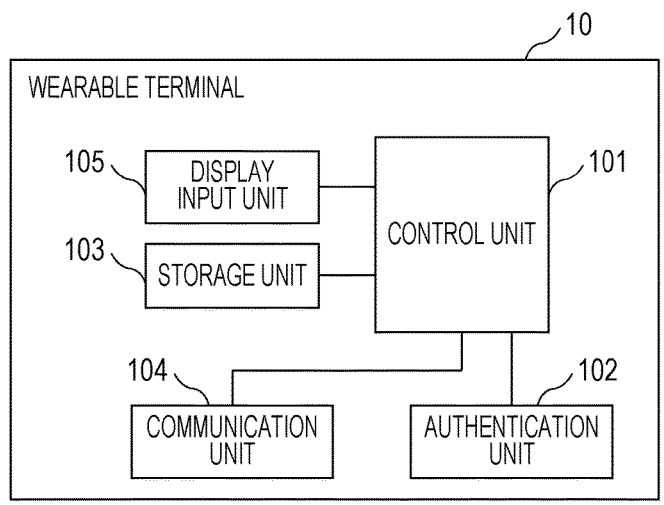
FIG. 3 is a functional block diagram illustrating the configuration of the wearable terminal according to the embodiment.
FIG. 4 illustrates an example of specific information for each application according to the embodiment.

FIG. 3 is a functional block diagram illustrating the configuration of the wearable terminal 10 according to the present embodiment.

The wearable terminal 10 is a wearable terminal which is mountable on a part of a body of a user and can be connected with another wearable terminal 11 by a radio communication network such as Bluetooth® and wifi or by human body communication. Here, the human body communication may be communication which is performed by supplying a signal to a surface layer of a human body which is a dielectric body or may be communication which is performed by supplying a signal to an electric field which is generated on a surface of a human body which is a dielectric body. That is, the human body communication is communication in which a human body is used as a communication medium.

In the present embodiment, the wearable terminal 10 includes a control unit 101, an authentication unit 102, a storage unit 103, a communication unit 104, and a display input unit 105, as illustrated in FIG. 3.

The authentication unit 102 is realized by the CPU 1003, the built-in storage 1004, the transmission/reception device 1008, and the like and has a function for authenticating another wearable terminal 11 which is different from the wearable terminal 10 (own terminal). Here, another wearable terminal 11 has the configuration and a function for performing an operation same as those of the wearable terminal 10, so that description thereof is omitted.

Here, the authentication unit 102 may authenticate another wearable terminal 11 in the case where predetermined operation information of another wearable terminal 11 and a predetermined operation with respect to the wearable terminal 10 (own terminal) are same operations as each other, for example. Further, the authentication unit 102 may authenticate another wearable terminal 11 when connection with another wearable terminal 11 by human body communication is established, for example. Details will be described later.

The storage unit 103 is realized by the built-in storage 1004 and the like and stores a plurality of programs which are different from each other. Each of these programs may be introduced (installed) to the wearable terminal 10 (own terminal) to be stored. Here, the storage unit 103 may further store information associated with each of the programs and a transmission propriety of the information as specific information. Further, the storage unit 103 may store authentication information which is information required for connection with the communication unit 104 such as an account and a password.

The communication unit 104 is realized by the CPU 1003, the transmission/reception device 1008, and the like and has a function to communicate with another wearable terminal 11. When another wearable terminal 11 is authenticated by the authentication unit 102, the communication unit 104 receives another terminal program information representing at least one program which is stored in another wearable terminal 11 from another wearable terminal 11. In the present embodiment, the another terminal program information may represent application information such as a name and an identification number of an application which is stored (introduced) in another wearable terminal 11 and may include account information of the application.

Further, the communication unit 104 is controlled by the control unit 101 and transmits specific information. The communication unit 104 may be configured to receive predetermined operation information of another wearable terminal 11, in the case where the authentication unit 102 performs authentication based on the predetermined operation information of another wearable terminal 11. Further, the communication unit 104 may be configured to transmit authentication information stored in the storage unit 103 with specific information.

The display input unit 105 is realized by the CPU 1003, the output device 1002, and the like. The display input unit 105 displays an image on a display screen based on the another terminal program information received by the communication unit 104. The image corresponds to a program identical to at least one program stored (or introduced) in another wearable terminal 11 among a plurality of programs stored in the storage unit 103 and is used for starting the program in response to an operation performed thereto. Further, the display input unit 105 receives an operation with respect to an image displayed on this display screen. Here, the image for starting the program is an icon which is a small image expressing the program, for example.

The control unit 101 is realized by the CPU 1003, the built-in storage 1004, the RAM 1005, and the like and controls the authentication unit 102, the storage unit 103, the communication unit 104, and the display input unit 105. When the display input unit 105 receives an operation with respect to a relevant image, the control unit 101 performs control for starting a relevant program corresponding to the image which has received the operation and for allowing the communication unit 104 to transmit specific information associated with the program to another wearable terminal 11. In the present embodiment, specific information is at least one of account data of a relevant program and profile data of a user, and text data, image data, voice data, and moving image data which are formed or stored by the program, for example.

Further, the control unit 101 allows the communication unit 104 to transmit specific information which is stored as transmittable information in the storage unit 103 to another wearable terminal 11. The control unit 101 may allow the communication unit 104 to transmit authentication information stored in the storage unit 103 with specific information.

Here, an example of specific information stored in the storage unit 103 is described with reference to FIG. 4. FIG. 4 illustrates an example of specific information for each application according to the present embodiment.

In the present embodiment, a plurality of applications including at least application A and application B are stored (introduced) in the wearable terminal 10. In the example illustrated in FIG. 4, specific information is account data of applications and other data. For example, as for the application A, a profile image and a photograph of an album are transmittable specific information which is preliminarily permitted by a user among the profile image, the photograph of an album, and a self-introduction text (text). Further, in FIG. 4, account data "Abcde" of the application A is shown as specific information which is transmitted with the profile image or the photograph of an album. Further, as for the application B, a phone number and an address are transmittable specific information which is preliminarily permitted by a user among the phone number, an E-mail address, the address, and a moving image, for example. Further, in FIG. 4, account data "vwxyz" of the application B is shown as specific information which is transmitted with the phone number or the address.

[Operation of Wearable Terminal 10]

An operation example of the wearable terminal 10 which is configured as described above is now described with reference to FIG. 5.

Figure 5:
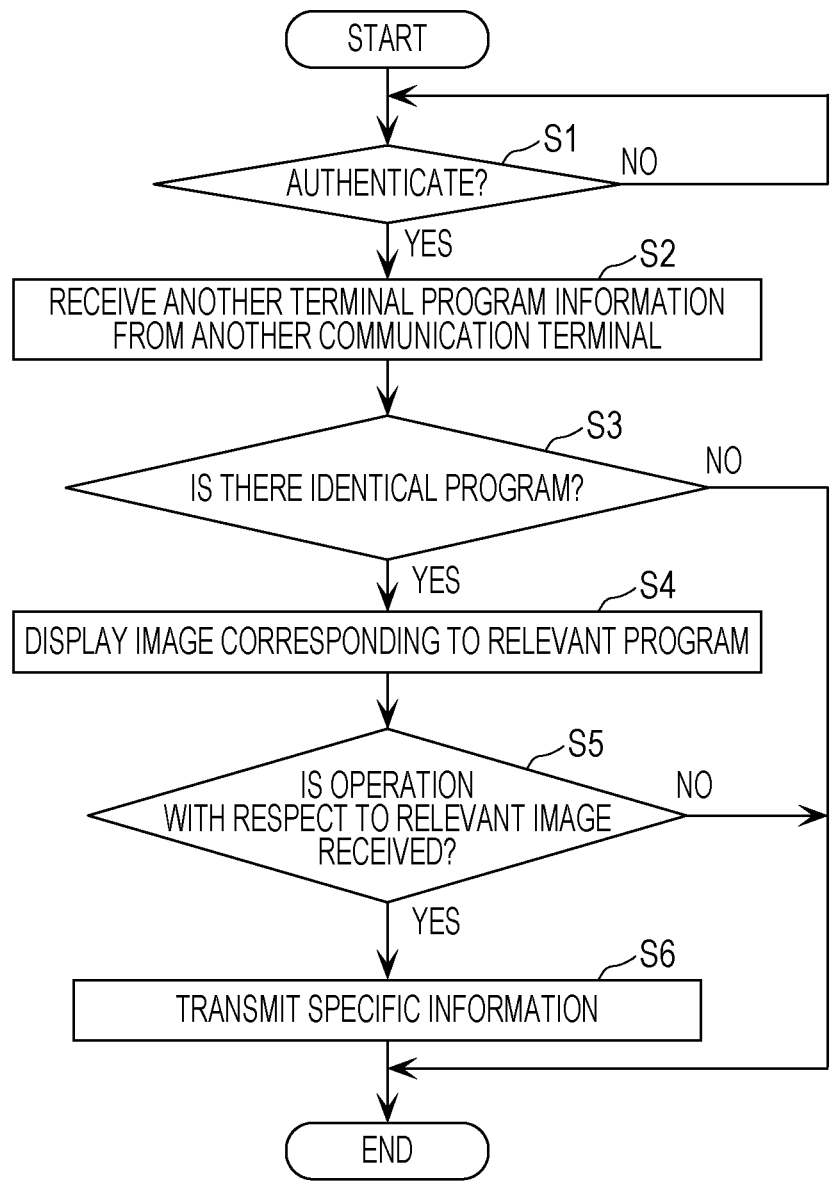
FIG. 5 is a flowchart illustrating an operation example of the wearable terminal according to the embodiment.

FIG. 5 is a flowchart illustrating an operation example of the wearable terminal 10 according to the present embodiment. An operation of the wearable terminal 10 is described below in accordance with FIG. 5.

When the wearable terminal 10 authenticates another wearable terminal 11 (YES in S1), the wearable terminal 10 receives another terminal program information representing at least one program stored (introduced) in another wearable terminal 11 from another wearable terminal 11 (S2). Here, the another terminal program information includes information of an application (application information) which is stored (introduced) in another wearable terminal 11. The another terminal program information may further include account information of the application, as described above.

Subsequently, the wearable terminal 10 determines whether or not there is a program identical to at least one program stored (introduced) in another wearable terminal 11 among a plurality of programs stored in the storage unit 103, based on the another terminal program information which is received in S2 (S3).

When there is an identical program in S3 (YES in S3), an image which corresponds to the identical program among a plurality of programs and is used for starting the identical program in response to an operation performed thereto is displayed on a display screen (S4). On the other hand, when there is no identical program in S3 (NO in S3), the wearable terminal 10 ends the processing. Here, an image representing absence of the identical program may be displayed on the display screen.

Then, when the wearable terminal 10 receives an operation with respect to the image which is displayed on the display screen (YES in S5), the wearable terminal 10 starts the program corresponding to the image, which has received the operation, and transmits specific information associated with the program to another wearable terminal 11 (S6).

Example 1

The configuration and an operation of a wearable terminal 10A which can be connected with another wearable terminal 11A through human body communication or the like will be described below as one example of the wearable terminal 10. Here, another wearable terminal 11A has the configuration and a function for performing an operation same as those of the wearable terminal 10A, so that description thereof is omitted.

[Configuration of Wearable Terminal 10A]

Various functional constituent elements of the wearable terminal 10A are first described with reference to FIG. 6.

Figure 6:
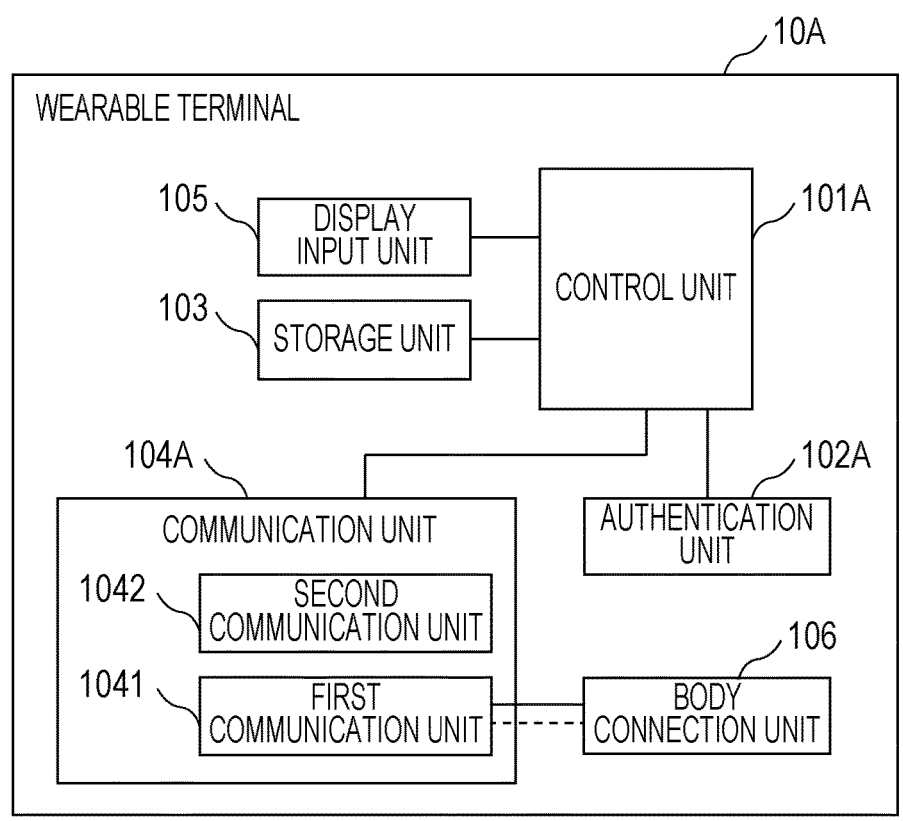
FIG. 6 is a functional block diagram illustrating the configuration of a wearable terminal according to Example 1.
Figure 7A:
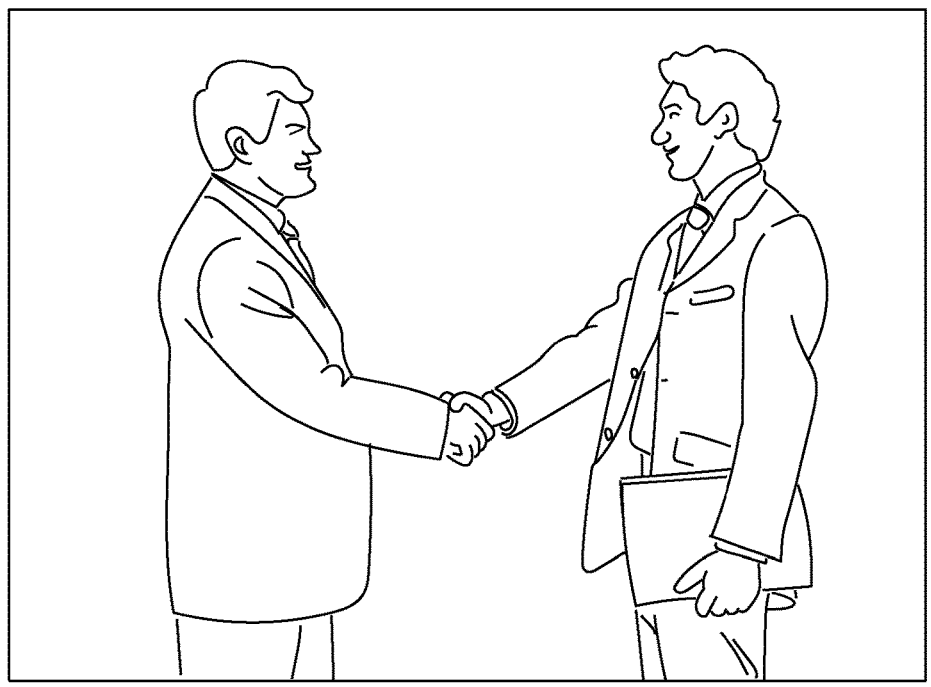
FIG. 7A illustrates an example of a using situation of the wearable terminal according to Example 1.
Figure 7B:
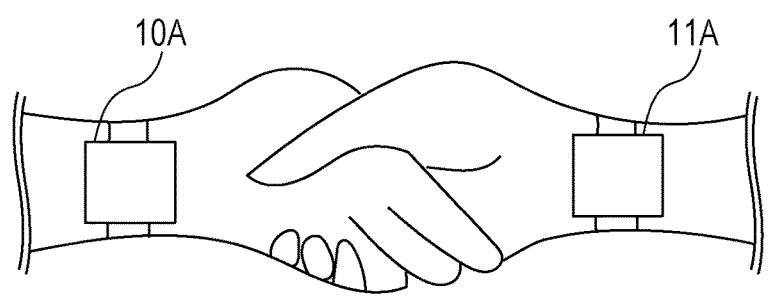
FIG. 7B schematically illustrates a state in which the wearable terminal and another wearable terminal are connected with each other through human body communication in the using situation illustrated in FIG. 7A.

FIG. 6 is a functional block diagram illustrating the configuration of the wearable terminal 10A according to Example 1. Elements same as those of FIG. 3 are given reference characters identical to those of FIG. 3 and detailed description thereof is omitted. FIG. 7A illustrates an example of a using situation of a wearable terminal according to Example 1. FIG. 7B schematically illustrates a state in which the wearable terminal 10A and another wearable terminal 11A are connected with each other through human body communication in the using situation illustrated in FIG. 7A.

As illustrated in FIG. 6, the wearable terminal 10A includes a control unit 101A, an authentication unit 102A, a storage unit 103, a communication unit 104A, a display input unit 105, and a body connection unit 106. The wearable terminal 10A illustrated in FIG. 6 has the configuration obtained by adding the body connection unit 106 to the wearable terminal 10 illustrated in FIG. 3 and the configurations of the control unit 101A, the authentication unit 102A, and the communication unit 104A are different from corresponding ones of the wearable terminal 10.

The body connection unit 106 is realized by the CPU 1003, the transmission/reception device 1008, and the like and is an interface for connecting to a body. For example, the body connection unit 106 can establish connection through human body communication when body connection unit 106 is connected to a surface layer of a human body. In the example illustrated in FIG. 7B, the body connection unit 106 is configured on a back surface of the wearable terminal 10A and can establish connection through human body communication when the body connection unit 106 is brought into contact with (or close to) a skin of an arm of a human body.

The communication unit 104A includes a first communication unit 1041 and a second communication unit 1042 as illustrated in FIG. 6.

The first communication unit 1041 communicates with another wearable terminal 11A by human body communication which is performed via the body connection unit 106 and is communication using human bodies as communication media. FIG. 7B illustrates an example in which the first communication unit 1041 can communicate with another wearable terminal 11A by human body communication performed through handshake between human bodies different from each other.

The second communication unit 1042 communicates with another wearable terminal 11A by radio communication performed without the intermediary of the body connection unit 106. Here, the radio communication is performed via a radio communication network such as Bluetooth® and wifi, for example.

The authentication unit 102A has the function of the authentication unit 102. In the present example, when connection with another wearable terminal 11A through human body communication is established by the first communication unit 1041, the authentication unit 102A authenticates another wearable terminal 11A. In the example illustrated in FIG. 7B, connection with another wearable terminal 11A through human body communication is established by the first communication unit 1041 in response to handshake between different human bodies and the authentication unit 102A authenticates another wearable terminal 11A in response to the establishment of the connection of the human body communication.

The control unit 101A has the function of the control unit 101 and controls the authentication unit 102A, the storage unit 103, the communication unit 104A, the display input unit 105, and the body connection unit 106.

In the present example, the control unit 101A allows the first communication unit 1041 to transmit specific information to another wearable terminal 11A. Here, the control unit 101A may allow the communication unit 104A to transmit specific information to another wearable terminal 11A during connection through the human body communication.

Here, the control unit 101A may allow the second communication unit 1042 to transmit specific information to another wearable terminal 11A. Further, the control unit 101A may allow the first communication unit 1041 to transmit a part of specific information to another wearable terminal 11A during connection through the human body communication. In this case, the control unit 101A allows the second communication unit 1042 to transmit information of the rest of the specific information to another wearable terminal 11A after disconnection of the human body communication or in the case where approval is obtained from another wearable terminal 11A (in the case where the wearable terminal 10A receives approval information).

Further, the control unit 101A may switch the first communication unit 1041 and the second communication unit 1042 based on an attribute of specific information and allow the first communication unit 1041 or the second communication unit 1042, which is switched, to transmit specific information to another wearable terminal 11A. In the case where the attribute is data capacity, for example, the control unit 101A may allow the second communication unit 1042 to transmit specific information to another wearable terminal 11A when the data capacity of the specific information is equal to or larger than a predetermined value and may allow the first communication unit 1041 to transmit specific information to another wearable terminal 11A when the data capacity of the specific information is smaller than the predetermined value. Here, a predetermined value of the data capacity is a value which is defined to be equal to or smaller than several dozen kilobytes such as 1 kilobyte. This is because data transmission capacity in the case using the human body communication is limited. Here, the first communication unit 1041 and the second communication unit 1042 may be switched not in accordance with an attribute of specific information but in accordance with a classification of data included in the specific information. For example, when data included in specific information is an address, the control unit 101A may allow the first communication unit 1041 to transmit specific information representing an address to another wearable terminal 11A and when the data included in specific information is an image, the control unit 101A may allow the second communication unit 1042 to transmit specific information representing an image to another wearable terminal 11A.

[Operation of Wearable Terminal 10A]

An operation example of the wearable terminal 10A configured as described above is now described with reference to FIGS. 8 to 13.

Figure 9A:
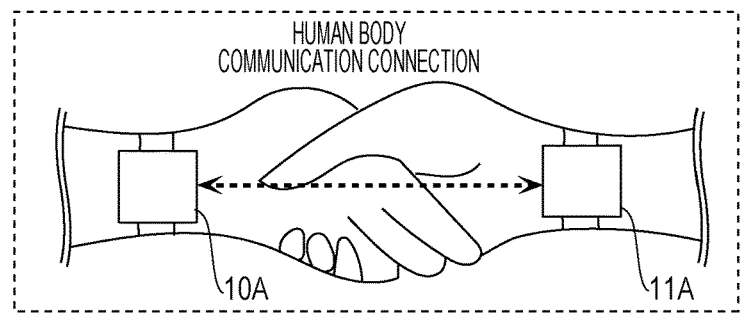
FIG. 9A schematically illustrates an operation example of the wearable terminal according to Example 1.
Figure 9B:
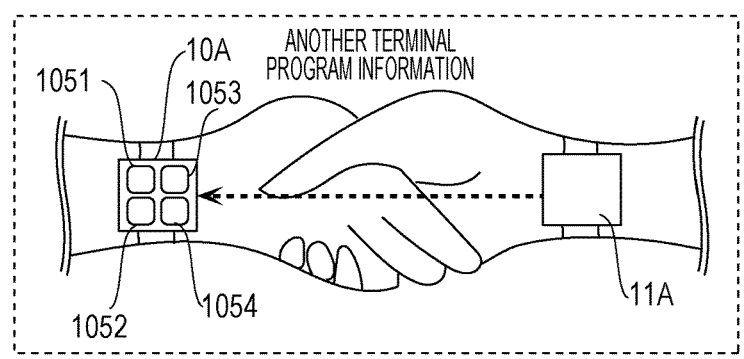
FIG. 9B schematically illustrates the operation example of the wearable terminal according to Example 1.
Figure 9C:
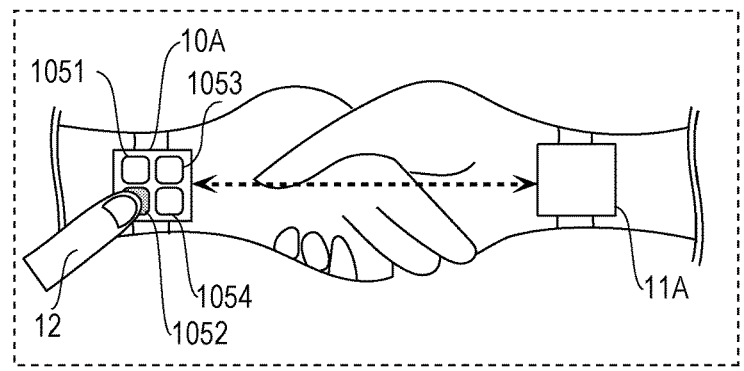
FIG. 9C schematically illustrates the operation example of the wearable terminal according to Example 1.
Figure 9D:
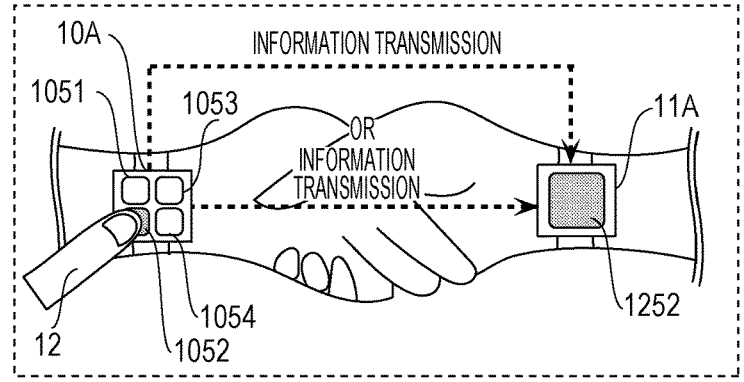
FIG. 9D schematically illustrates the operation example of the wearable terminal according to Example 1.
Figure 10:
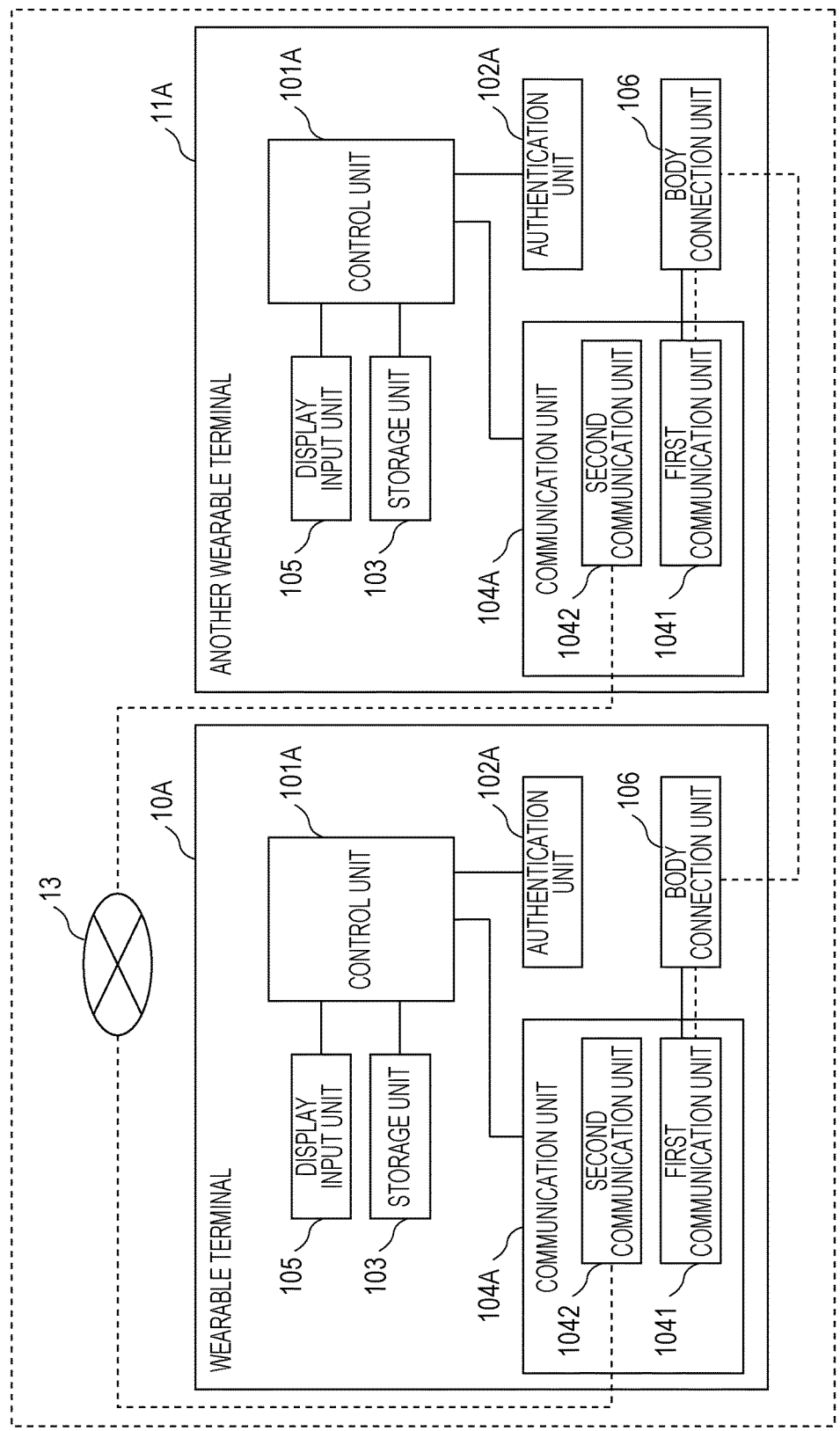
FIG. 10 illustrates the functional configurations of the wearable terminal and another wearable terminal in the operation example of FIG. 9D.

FIG. 8 is a flowchart illustrating an example of an operation of the wearable terminal 10A according to Example 1. FIGS. 9A to 9D schematically illustrate an operation example of the wearable terminal 10A. Here, S12 to S16 illustrated in FIG. 8 are processing similar to those of S2 to S6 illustrated in FIG. 5 and processing of S11 illustrated in FIG. 8 is a specific example of processing of S1 illustrated in FIG. 5. Further, FIG. 10 illustrates the functional configurations of the wearable terminal 10A and another wearable terminal 11A in the operation example of FIG. 9D. Elements same as those of FIG. 6 are given the reference characters identical to those of FIG. 6 and detailed description thereof is omitted.

The wearable terminal 10A detects whether or not connection with another wearable terminal 11A through human body communication is established (S11).

Then, when the wearable terminal 10A detects that connection with another wearable terminal 11A through human body communication is established (YES in S11), the wearable terminal 10A authenticates another wearable terminal 11A. In the example illustrated in FIG. 9A, for example, connection through human body communication is established between the wearable terminal 10A and another wearable terminal 11A in response to handshake between human bodies different from each other. When connection using human body communication is thus established, the wearable terminal 10A and another wearable terminal 11A are authenticated. Here, when the wearable terminal 10A detects no establishment of connection with another wearable terminal 11A through human body communication (NO in S11), the wearable terminal 10A repeats the processing of S11 until the wearable terminal 10A detects establishment of the connection.

Subsequently, the wearable terminal 10A receives another terminal program information representing at least one program stored (introduced) in another wearable terminal 11A from another wearable terminal 11A (S12).

Then, the wearable terminal 10A determines whether or not there is a program identical to at least one program stored (introduced) in another wearable terminal 11A among a plurality of programs stored in the storage unit 103, based on the another terminal program information which is received in S12 (S13). Here, when there is no identical program in S13 (NO in S13), the wearable terminal 10A ends the processing.

When there is an identical program in S13 (YES in S13), an image which corresponds to the identical program among a plurality of programs and is used for starting the identical program in response to an operation performed thereto is displayed on a display screen (S14). A specific example is described by using an example illustrated in FIG. 9B. In the case where the wearable terminal 10A receives another terminal program information and identification information of another wearable terminal 11A from another wearable terminal 11A, with which connection through human body communication is established, and identical programs are stored (introduced) in the wearable terminal 10A and another wearable terminal 11A, icons of the identical programs are displayed as images corresponding to the identical programs. In FIG. 9B, four icons (an icon 1051, an icon 1052, an icon 1053, and icon 1054) are shown on the display input unit 105 of the wearable terminal 10A on the assumption that four kinds of identical programs are stored (introduced) in the wearable terminal 10A and another wearable terminal 11A.

Then, when the wearable terminal 10A receives an operation with respect to the image displayed on the display screen (YES in S15), the wearable terminal 10A starts the program corresponding to the image, which has received the operation, and transmits specific information associated with the program to another wearable terminal 11A (S16).

A specific example is described with reference to FIGS. 9C and 9D. In FIG. 9C, selection or an operation such as tapping is performed by a user with respect to the icon 1052 among the four icons (the icons 1051 to 1054) displayed on the display input unit 105 of the wearable terminal 10A. In FIG. 9D, a state is illustrated in which a program corresponding to the icon 1052 is started in response to the operation and specific information associated with the program is transmitted to another wearable terminal 11A by human body communication or radio communication. Here, the human body communication is realized by communication between the first communication units 1041 via the body connection units 106 in the wearable terminal 10A and another wearable terminal 11A as illustrated in FIG. 10. The radio communication is realized by communication between the second communication units 1042 via the network 13 such as Bluetooth® and wifi in the wearable terminal 10A and another wearable terminal 11A as illustrated in FIG. 10.

Thus, when the wearable terminal 10A authenticates another wearable terminal 11A, an image corresponding to a program (an application) which is stored or introduced (installed) in another wearable terminal 11A and stored or introduced in the wearable terminal 10A is displayed. Therefore, a user can transmit specific information associated with the program to another wearable terminal 11A only by performing an operation such as tapping with respect to the displayed image. That is, a user wearing the wearable terminal 10A can quickly grasp information which can be transmitted (reciprocated or exchanged with another wearable terminal 11A) to another wearable terminal 11A which is a connection destination and can transmit information with a few operations.

Thus, a user wearing the wearable terminal 10A can perform natural and simple information exchange with a user wearing another wearable terminal 11A.

The description of the example of the case where the wearable terminal 10A transmits specific information to another wearable terminal 11A by using the first communication unit 1041 or the second communication unit 1042 is provided as an operation example described with reference to FIG. 8, but the operation is not limited to this. As described above, the wearable terminal 10A may switch the first communication unit 1041 and the second communication unit 1042 based on an attribute of specific information to allow the first communication unit 1041 or the second communication unit 1042 to transmit the specific information to another wearable terminal 11A. Further, the wearable terminal 10A may allow the first communication unit 1041 and the second communication unit 1042 to respectively transmit a part of specific information and information of the rest of the specific information to another wearable terminal 11A.

An operation example is now described below in which the first communication unit 1041 and the second communication unit 1042 are switched to each other to allow the first communication unit 1041 or the second communication unit 1042 to transmit specific information to another wearable terminal 11A in the case where an attribute of the specific information is data capacity of the specific information, with reference to FIG. 11.

Figure 11:
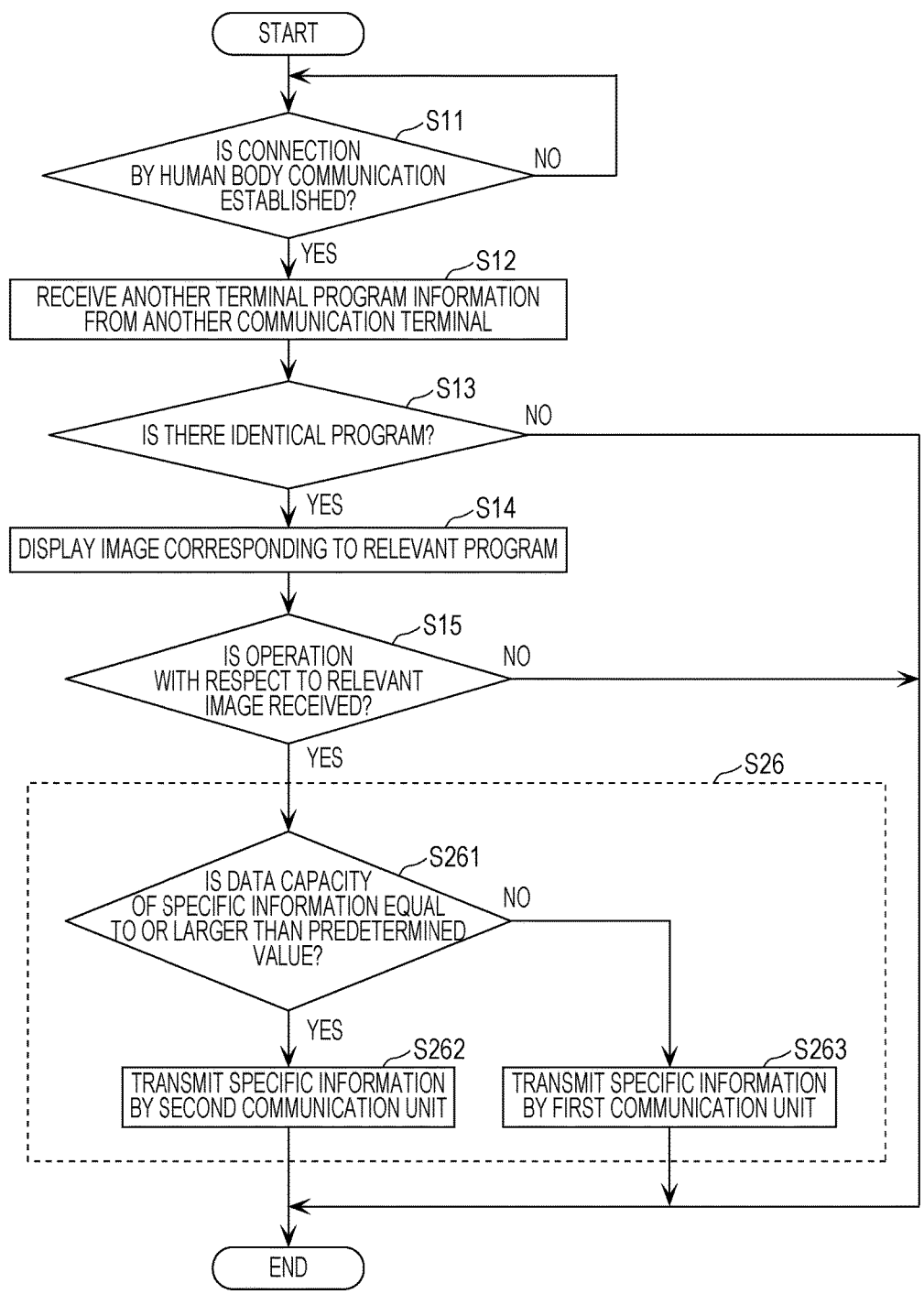
FIG. 11 is a sequence diagram illustrating another operation example of the wearable terminal according to Example 1.

FIG. 11 is a sequence diagram illustrating another operation example of the wearable terminal 10A according to the present example. Here, elements same as those of FIG. 8 are given the reference characters identical to those of FIG. 8 and detailed description thereof is omitted. That is, S11 to S15 have been described with reference to FIG. 8, so that description thereof is omitted.

When the wearable terminal 10A receives an operation with respect to the image displayed on the display screen in S15 (YES in S15), the wearable terminal 10A starts the program corresponding to the image, which has received the operation, and executes specific information transmission processing in which specific information associated with the program is transmitted to another wearable terminal 11A (S26).

More specifically, the wearable terminal 10A first determines whether or not the data capacity of the specific information is equal to or larger than a predetermined value in S26 (S261). Subsequently, when the data capacity of the specific information is equal to or larger than the predetermined value (YES in S261), the wearable terminal 10A allows the second communication unit 1042 to transmit the specific information to another wearable terminal 11A (S262). On the other hand, when the data capacity of the specific information is smaller than the predetermined value (NO in S261), the wearable terminal 10A allows the first communication unit 1041 to transmit the specific information to another wearable terminal 11A (S263).

Thus, communication units which are allowed to perform transmission with respect to another wearable terminal 11A are switched in accordance with the data capacity of specific information and accordingly, specific information can be transmitted to another wearable terminal 11A by a communication unit suitable for the data capacity. This is because the data transmission capacity in human body communication using the first communication unit 1041 is limited.

An operation example in the case where the first communication unit 1041 and the second communication unit 1042 respectively transmit a part of specific information and information of the rest of the specific information to another wearable terminal 11A is now described with reference to FIGS. 12 and 13.

Figure 12:
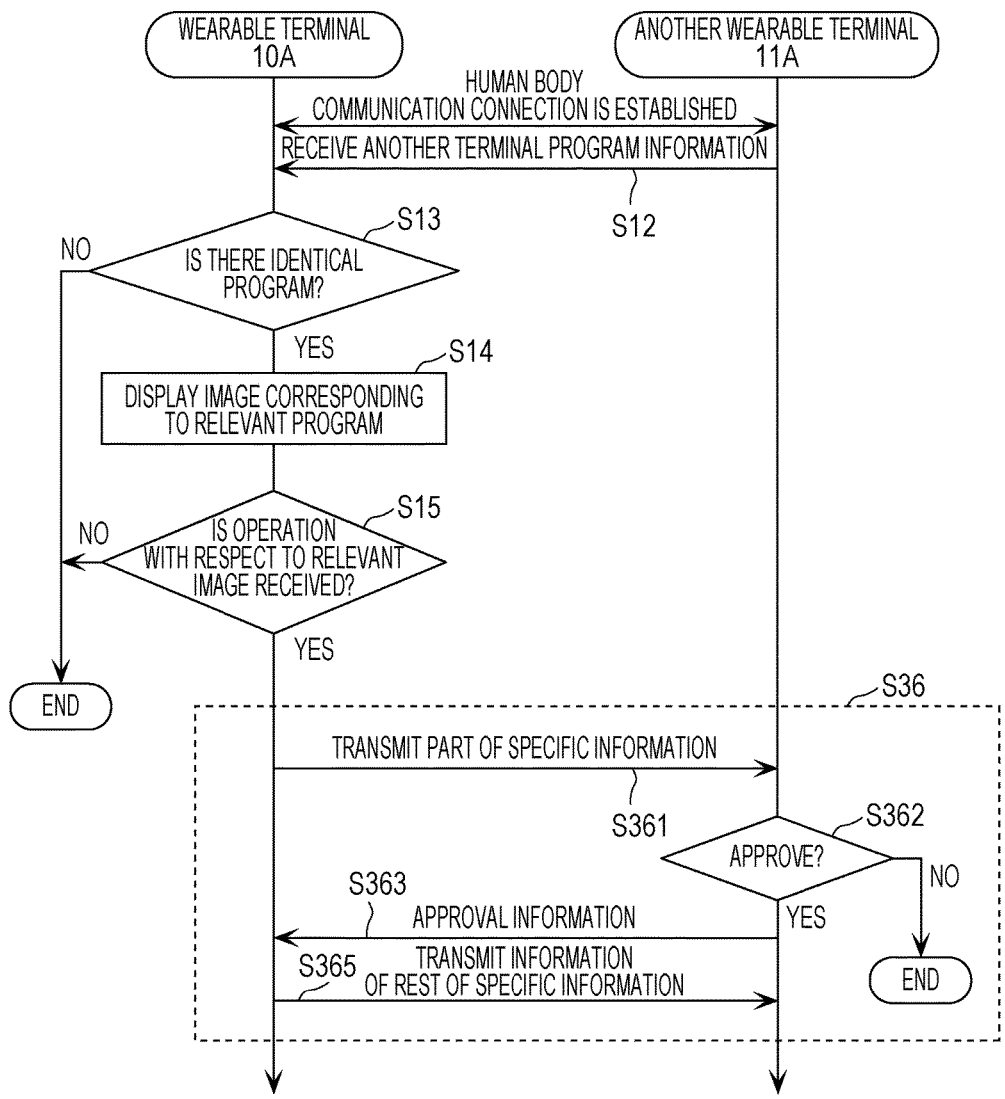
FIG. 12 is a sequence diagram illustrating still another operation example of the wearable terminal according to Example 1.
Figure 13:
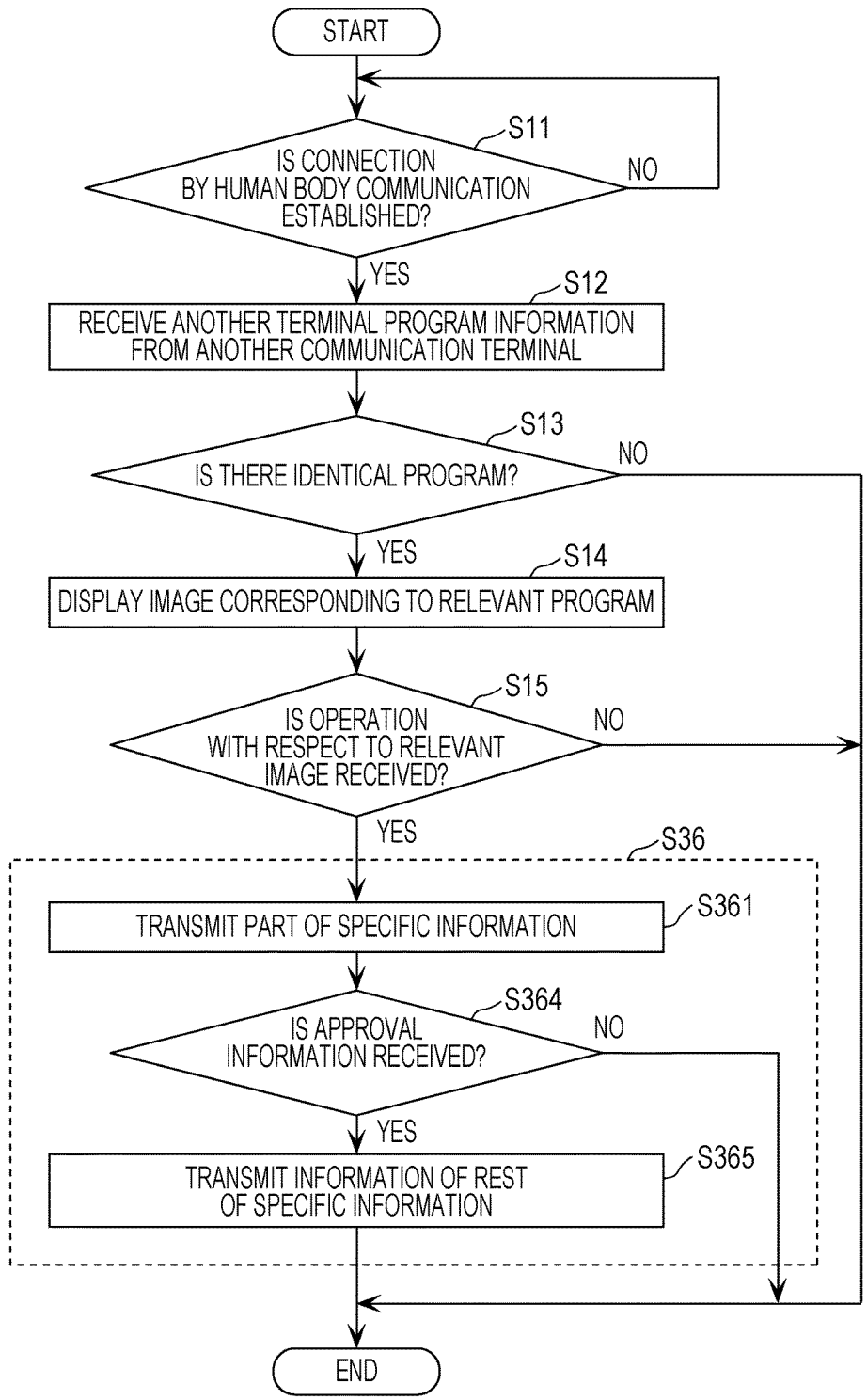
FIG. 13 is a flowchart illustrating the operation example of the wearable terminal illustrated in FIG. 12.

FIG. 12 is a sequence diagram illustrating still another operation example of the wearable terminal 10A according to the present example. FIG. 13 is a flowchart illustrating the operation example of the wearable terminal 10A illustrated in FIG. 12. Here, elements same as those of FIG. 8 are given the reference characters identical to those of FIG. 8 and detailed description thereof is omitted. That is, S11 to S15 have been described with reference to FIG. 8, so that description thereof is omitted.

When the wearable terminal 10A receives an operation with respect to the image displayed on the display screen in S15 (YES in S15), the wearable terminal 10A starts the program corresponding to the image, which has received the operation, and executes specific information transmission processing in which specific information associated with the program is transmitted to another wearable terminal 11A (S36).

More specifically, the wearable terminal 10A first determines whether or not the data capacity of the specific information is equal to or larger than a predetermined value in S36 (S261). Subsequently, the wearable terminal 10A allows the first communication unit 1041 to transmit a part of the specific information to another wearable terminal 11A (S361). Subsequently, when another wearable terminal 11A receives the part of the specific information by the first communication unit 1041 thereof, another wearable terminal 11A confirms whether or not a user approves reception of information of the rest of the specific information through the second communication unit 1042 thereof, with a user (S362). When a user of another wearable terminal 11A approves the reception (YES in S362), another wearable terminal 11A transmits approval information representing the approval of the user of another wearable terminal 11A through human body communication (S363). Then, when the wearable terminal 10A receives the approval information (YES in S364), the wearable terminal 10A allows the second communication unit 1042 to transmit information of the rest of the specific information to another wearable terminal 11A (S365).

Here, in the case where the information of the rest of the specific information is transmitted by the second communication unit 1042, authentication information which is information required for establishment of connection, such as an account and a password, for communication by the second communication unit 1042 of another wearable terminal 11A may be included in the approval information.

Here, the description in which information of the rest of the specific information is transmitted by the second communication unit 1042 is provided in the above-described example. However, the information of the rest of the specific information may be transmitted by the first communication unit 1041, that is, by human body communication.

Thus, a part of specific information can be transmitted to another wearable terminal 11A by human body communication and information of the rest of the specific information can be transmitted by radio communication or the like after reception of approval. More specifically, the control unit 101A can allow the second communication unit 1042 to transmit information of the rest of the specific information to another wearable terminal 11A after disconnection of human body communication and after reception of approval information from another wearable terminal 11A.

Accordingly, a user of another wearable terminal 11A can select acquisition of information of the rest of specific information based on approval propriety after acquiring a part of the specific information through human body communication.

Example 2

The configuration of a wearable terminal 10B which does not use human body communication is now described as another example of the wearable terminal 10.
[Configuration of Wearable Terminal 10B]

Figure 14:
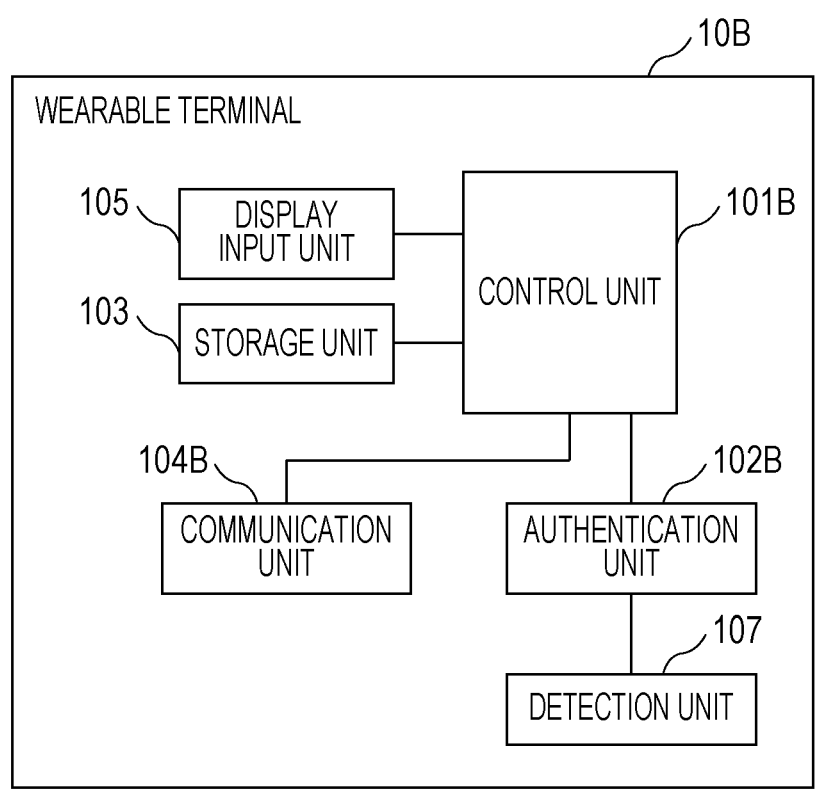
FIG. 14 is a functional block diagram illustrating the configuration of a wearable terminal according to Example 2.

FIG. 14 is a functional block diagram illustrating the configuration of the wearable terminal 10B according to Example 2. Elements same as those of FIGS. 3 and 6 are given reference characters identical to those of FIGS. 3 and 6 and detailed description thereof is omitted.

As illustrated in FIG. 14, the wearable terminal 10B includes a control unit 101B, an authentication unit 102B, a storage unit 103, a communication unit 104B, a display input unit 105, and a detection unit 107. The wearable terminal 10B illustrated in FIG. 14 has the configuration obtained by adding the detection unit 107 to the wearable terminal 10 illustrated in FIG. 3 and the configurations of the control unit 101B, the authentication unit 102B, and the communication unit 104B are different from corresponding ones of the wearable terminal 10.

The detection unit 107 is realized by the CPU 1003, the transmission/reception device 1008, and the like and has a function for detecting a first action with respect to the wearable terminal 10B. For example, the detection unit 107 may be configured to include a motion sensor and an acceleration sensor so as to detect a vertical movement performed with respect to the wearable terminal 10B and an inclination action such as bowing, a hugging action, an action for high five, a gesture action, and the like of a user wearing the wearable terminal 10B, as a first action, based on a value representing inclination of the wearable terminal 10B, a value representing an acceleration rate, and the like.

The communication unit 104B has the function of the communication unit 104. In the present example, the communication unit 104B receives second action information representing a second action with respect to another wearable terminal 11B. Here, another wearable terminal 11B has the configuration and a function for performing an operation same as those of the wearable terminal 10B, so that description thereof is omitted.

The authentication unit 102B has the function of the authentication unit 102. In the present example, when it is determined that the second action represented by the second action information received by the communication unit 104B is an action identical to the first action detected by the detection unit 107, the authentication unit 102B authenticates another wearable terminal 11B. Specifically, when a value which represents an acceleration rate of the wearable terminal 10B and is detected by the detection unit 107 and a value which represents inclination of another wearable terminal 11B and is included in the second action information are within a predetermined range, it may be determined that the first action and the second action are identical to each other. A value used for the determination may be a value representing inclination of the wearable terminal 10B or other values detected by the detection unit 107 and is not limited to these examples.

Accordingly, the wearable terminal 10B and another wearable terminal 11B can be authenticated with a simple action such as an inclination action which is bowing or the like, a hugging action, an action for high five, and a gesture action as the first action and the second action.

The control unit 101B has the function of the control unit 101 and controls the authentication unit 102B, the storage unit 103, the communication unit 104B, the display input unit 105, and the detection unit 107. In the present example, the control unit 101B allows the communication unit 104B to transmit specific information to another wearable terminal 11B. Further, the control unit 101B transmits first action information representing the first action performed with respect to the wearable terminal 10B, which is detected by the detection unit 107, so as to allow another wearable terminal 11B to authenticate the own terminal (the wearable terminal 10B).

The operation of the wearable terminal 10B configured as described above is same as that described in S2 to S6 of FIG. 5 after the authentication by using the first action with respect to the wearable terminal 10B and the second action with respect to another wearable terminal 11B in S1 of FIG. 5, so that description thereof is omitted.
[Advantageous Effect Etc.]

As described above, the wearable terminal according to an aspect of the present disclosure is mountable on a part of a body and includes an authentication unit, a storage unit, a communication unit, a display input unit, and a control unit. The authentication unit authenticates another wearable terminal which is different from the wearable terminal, the storage unit stores a plurality of programs which are different from each other, the communication unit communicates with the another wearable terminal so as to receive another terminal program information representing at least one program stored in the another wearable terminal from the another wearable terminal in a case where the another wearable terminal is authenticated by the authentication unit, the display input unit displays an image, which corresponds to a program identical to the at least one program stored in the another wearable terminal among the plurality of programs stored in the storage unit and is used for starting the program in response to an operation performed thereto, on a display screen based on the another terminal program information, which is received by the communication unit, so as to receive an operation with respect to the image which is displayed on the display screen, and in a case where the display input unit receives an operation with respect to the image, the control unit starts the program corresponding to the image which receives the operation and allows the communication unit to transmit specific information associated with the program to the another wearable terminal.

Accordingly, when another wearable terminal is authenticated, an image corresponding to a program (an application) stored in another wearable terminal and the wearable terminal according to the present aspect is displayed. Therefore, a user can transmit specific information associated with the program to another wearable terminal only by performing an operation such as tapping with respect to the displayed image. That is, a user wearing the wearable terminal according to the present aspect can quickly grasp information which can be transmitted (reciprocated or exchanged with another wearable terminal) to another wearable terminal which is a connection destination and can transmit information with a few operations.

Thus, a wearable terminal by which a user wearing the wearable terminal can perform natural and simple information exchange with a user wearing another wearable terminal can be realized.

Here, for example, a body connection unit which connects to a body may be further included, the communication unit may include a first communication unit which communicates with the another wearable terminal by human body communication, which is communication using a human body as a communication medium, via the body connection unit and a second communication unit which communicates with the another wearable terminal by radio communication performed without an intermediary of the body connection unit, and the authentication unit may authenticate the another wearable terminal in a case where connection with the another wearable terminal through the human body communication is established by the first communication unit.

Accordingly, when connection using the human body communication is established, the wearable terminal according to the present aspect and another wearable terminal can be authenticated.

Further, for example, a detection unit which detects a first action with respect to the wearable terminal may be further included, the control unit may receive second action information representing a second action with respect to the another wearable terminal, and the authentication unit may authenticate the another wearable terminal in a case of determination in which the second action represented by the second action information received by the communication unit and the first action detected by the detection unit are an identical action.

Accordingly, the wearable terminal according to the present aspect and another wearable terminal can be authenticated with a simple action such as an inclination action which is bowing or the like, a hugging action, an action for high five, and a gesture action as the first action and the second action.

(Modification)

In the above-described embodiment, the description is provided in which the wearable terminal 10 and the like transmit specific information to another wearable terminal 11 and the like via human body communication or a network. However, the configuration is not limited to this. The wearable terminal 10 and the like may transmit specific information to another wearable terminal 11 and the like via a specific server (an external server 14) which is provided by a web service or the like.

As an example of this case, the case where the above-described wearable terminal 10A transmits specific information not via human body communication but via the external server 14 is described with reference to FIG. 15. The description will be provided on the assumption that the wearable terminal 10A and another wearable terminal 11A of the present modification can communicate with the external server 14 via a radio communication network such as wifi with the second communication units 1042.

Figure 15:
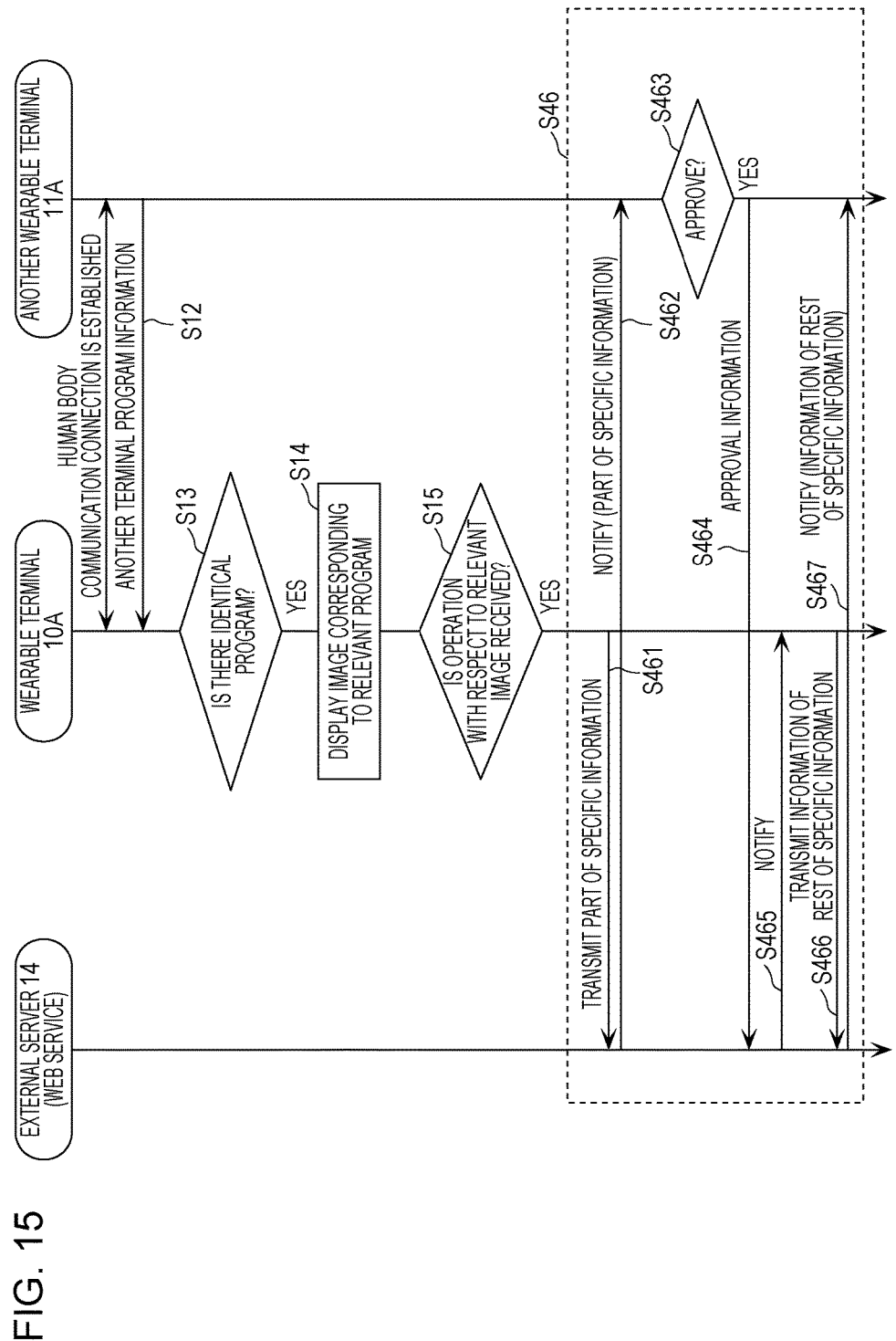
FIG. 15 is a sequence diagram illustrating an operation example of a wearable terminal according to a modification.

FIG. 15 is a sequence diagram illustrating an operation example of the wearable terminal 10A according to the present modification. Elements same as those of FIG. 12 are given reference characters identical to those of FIG. 12 and detailed description thereof is omitted. That is, S11 to S15 have been described with reference to FIG. 12, so that description thereof is omitted.

When the wearable terminal 10A receives an operation with respect to the image displayed on the display screen in S15 (YES in S15), the wearable terminal 10A starts the program corresponding to the image, which has received the operation, and executes specific information transmission processing in which specific information associated with the program is transmitted to another wearable terminal 11A (S46).

More specifically, the wearable terminal 10A first allows the second communication unit 1042 to transmit information representing that a reaching object is another wearable terminal 11A and a part of the specific information to the external server 14 in S46 (S461). Then, the external server 14 notifies another wearable terminal 11A of the possession of a part of the specific information transmitted from the wearable terminal 10A (S462).

Subsequently, when another wearable terminal 11A accesses the external server 14 by the second communication unit 1042 thereof and receives the part of the specific information, another wearable terminal 11A confirms whether or not a user of another wearable terminal 11A approves reception of information of the rest of the specific information with the user (S463). When the user of another wearable terminal 11A approves the reception (YES in S463), another wearable terminal 11A transmits approval information representing the approval of the user of another wearable terminal 11A to the external server 14 by the second communication unit 1042 (S464). Then, the external server 14 notifies the wearable terminal 10A of the reception of the approval information from another wearable terminal 11A (S465).

Subsequently, the wearable terminal 10A allows the second communication unit 1042 to transmit information representing that a reaching object is another wearable terminal 11A and information of the rest of the specific information to the external server 14 (S466). Then, the external server 14 notifies another wearable terminal 11A of the possession of the information of the rest of the specific information transmitted from the wearable terminal 10A (S467).

Then, another wearable terminal 11A accesses the external server 14 by the second communication unit 1042 thereof to receive the information of the rest of the specific information.

Thus, the wearable terminal 10A first transmits a part of specific information to another wearable terminal 11A via the external server 14 and further transmits information of the rest of the specific information to another wearable terminal 11A via the external server 14 after approval of a user of another wearable terminal 11A.

Accordingly, the user of another wearable terminal 11A can select acquisition of information of the rest of the specific information based on approval propriety after acquisition of a part of the specific information.

Here, the authentication methods of the above-described embodiment are merely examples and the method is not limited to these examples.

The authentication units 102, 102A, and 102B may detect a distance between another wearable terminal 11 and the wearable terminal 10 (own terminal) with communication units which are the communication units 104, 104A, and 104B. At this time, when the distance is equal to or shorter than a predetermined distance (for example, 1 m), the authentication units 102, 102A, and 102B may authenticate another wearable terminal 11.

Further, the wearable terminals 10, 10A, and 10B and another wearable terminals 11, 11A, and 11B may include a global positioning system (GPS) receiver so as to be able to measure positions of the own terminals. In this case, the authentication units 102, 102A, and 102B of the wearable terminals 10, 10A, and 10B may receive positional information representing positions of another wearable terminals 11, 11A, and 11B from another wearable terminals 11, 11A, and 11B via the communication units 104, 104A, and 104B. At this time, the authentication units 102, 102A, and 102B of the wearable terminals 10, 10A, and 10B may authenticate another wearable terminals 11, 11A, and 11B when the authentication units 102, 102A, and 102B determine that respective distances between positions of the own terminals which are measured by the GPS receivers provided to the own terminals and positions represented by the positional information received from another wearable terminals 11, 11A, and 11B are within a predetermined distance. That is, when respective distances between the wearable terminals 10, 10A, and 10B and another wearable terminals 11, 11A, and 11B are within the predetermined distances, the wearable terminals 10, 10A, and 10B may authenticate another wearable terminals 11, 11A, and 11B.

Further, each of the wearable terminals 10, 10A, and 10B and another wearable terminals 11, 11A, and 11B may include a speaker which outputs sounds, for example. Further, the detection unit 107 may include a microphone which detects sounds. In the case where the detection unit 107 includes a microphone, the detection unit 107 may detect a specific sound emitted from the speaker of another wearable terminals 11, 11A, and 11B by using the microphone and transmit information representing the detected specific sound to the authentication unit 102B of the wearable terminal 10B. The authentication unit 102B may authenticate another wearable terminals 11, 11A, and 11B when the authentication unit 102B acquires the information representing the specific sound from the detection unit 107.

Further, the authentication unit 102B of the wearable terminal 10B may receive voice information representing a voice detected by the detection unit 107 of another wearable terminal 11B from another wearable terminal 11B via the communication unit 104B. At this time, the authentication unit 102B of the wearable terminal 10B may compare the voice acquired from the detection unit 107 included in the wearable terminal 10B with a voice represented by the voice information received from another wearable terminal 11B and may authenticate another wearable terminal 11B when the authentication unit 102B determines that these voices are approximately identical to each other. That is, when the wearable terminal 10B and another wearable terminal 11B detect equivalent voices, the wearable terminal 10B may authenticate another wearable terminal 11B.

Further, the wearable terminals 10, 10A, and 10B and another wearable terminals 11, 11A, and 11B may include a light unit emitting light, for example. Further, the detection unit 107 may include an optical sensor detecting light. In the case where the detection unit 107 includes an optical sensor, the detection unit 107 may detect specific light emitted from the light unit of another wearable terminals 11, 11A, and 11B with the optical sensor and transmit information representing the detected specific light to the authentication unit 102B of the wearable terminal 10B. When the authentication unit 102B acquires the information representing the specific light from the detection unit 107, the authentication unit 102B may authenticate another wearable terminals 11, 11A, and 11B.

Further, the authentication unit 102B of the wearable terminal 10B may receive light detection information representing light detected by the detection unit 107 of another wearable terminal 11B from another wearable terminal 11B via the communication unit 104B. At this time, the authentication unit 102B of the wearable terminal 10B may compare the light acquired from the detection unit 107 included in the wearable terminal 10B with light represented by the light detection information received from another wearable terminal 11B and may authenticate another wearable terminal 11B when the authentication unit 102B determines that these beams of light are approximately identical to each other. That is, when the wearable terminal 10B and another wearable terminal 11B detect equivalent beams of light, the wearable terminal 10B may authenticate another wearable terminal 11B.

In order to determine whether or not equivalent beams of light are detected between the wearable terminal 10B and another wearable terminal 11B, a wavelength of light, a color of light, the intensity of light, and a blink pattern of light, or a combination of these may be used.

Here, the light unit may be included in the display input unit 105.

Other Embodiments Etc

It is needless to say that the above-described embodiment is merely an example and various alterations, additions, and omissions, and the like may be made.

Function allocation of the control unit 101 and the like, the communication unit 104 and the like, and the authentication unit 102 and the like in the above-described wearable terminal 10 and the like is arbitrary and a part or the whole of functions of one may be included in the other.

The whole or a part of the above-described operation procedures of the wearable terminal 10 and the like may be realized by hardware such as the wearable terminal 10 or software. Here, processing by the software is realized when a processor included in the wearable terminal 10 and the like executes a control program stored in a memory. Further, the control program may be recorded in a recording medium so as to be distributed or circulated. For example, the distributed control program is installed on a device to be executed by a processor of the device, thereby being able to allow the device to perform the whole or a part of the above-described operation of the wearable terminal 10 and the like.

Further, an embodiment realized by arbitrarily combining the constituent elements and the functions illustrated in the above-described embodiment is also included in the scope of the present disclosure.

It should be noted that various general and specific aspects of the present disclosure include one or a combination of a device, a system, a method, an integrated circuit, a computer program, a recording medium readable by a computer, and the like.

Other embodiments obtained by implementing various modifications reached by a person skilled in the art with respect to the above-described embodiment and embodiments realized by arbitrarily combining the constituent elements and the functions in the above embodiment within the scope of the present disclosure are also included in the present disclosure.

The present disclosure is applicable to a wearable terminal, a communication method thereof, a program thereof, and the like. Especially, the present disclosure is applicable to a wearable terminal which is capable of using human body communication and a detection unit for a simple action such as a gesture action and is mountable on a part of a body of a user, a communication method thereof, a program thereof, and the like.

What is claimed is:

1. A wearable terminal comprising:
a processor; and
a memory having a computer program stored thereon, the computer program causing the processor to execute operations including:
authenticating another wearable terminal which is distinct from the wearable terminal,
storing a plurality of programs which are different from each other,
communicating with the another wearable terminal to receive another terminal program information representing at least one program stored in the another wearable terminal from the another wearable terminal when the another wearable terminal is authenticated,
determining whether the at least one program, which is represented by the another terminal program information, is or is not identical to each of the plurality of programs stored in the wearable terminal,
displaying an image on a display screen, the image corresponding to one of the plurality of programs stored in the wearable terminal which is identical to the at least one program stored in the another wearable terminal, when the at least one program stored in the another wearable terminal is determined to be identical to the one of the plurality of programs stored in the wearable terminal, the image being used for starting the one of the plurality of programs in response to receipt of an operation with respect to the image which is displayed on the display screen, and
when an operation with respect to the image is received, starting the one of the plurality of programs corresponding to the image which receives the operation and transmitting specific information associated with the one of the plurality of programs to the another wearable terminal.

2. The wearable terminal according to claim 1, further comprising:
a body connector which connects to a body;
a first communicator which communicates with the another wearable terminal by human body communication, the human body communication being communication using a human body as a communication medium, via the body connector; and
a second communicator which communicates with the another wearable terminal by radio communication performed without an intermediary of the body connector, wherein
the computer program causes the processor to execute operations including:
authenticating the another wearable terminal when connection with the another wearable terminal through the human body communication is established by the first communicator.

3. The wearable terminal according to claim 2, wherein the computer program causes the processor to execute operations including:
allowing the second communicator to transmit the specific information to the another wearable terminal.

4. The wearable terminal according to claim 3, wherein the computer program causes the processor to execute operations including:
allowing the first communicator to transmit the specific information to the another wearable terminal during connection through the human body communication.

5. The wearable terminal according to claim 3, wherein the computer program causes the processor to execute operations including:
allowing the first communicator to transmit a first part of the specific information to the another wearable terminal during connection through the human body communication and allowing the second communicator to transmit a further part of the specific information to the another wearable terminal after disconnection of the human body communication.

6. The wearable terminal according to claim 5, wherein the computer program causes the processor to execute operations including:
allowing the second communicator to transmit the further part of the specific information to the another wearable terminal after disconnection of the human body communication and after reception of approval information from the another wearable terminal.

7. The wearable terminal according to claim 2, wherein the computer program causes the processor to execute operations including:
allowing the first communicator to transmit the specific information to the another wearable terminal.

8. The wearable terminal according to claim 2, wherein the computer program causes the processor to execute operations including:
switching between the first communicator and the second communicator based on an attribute of the specific information and allowing the switched one of first communicator and the second communicator to transmit the specific information to the another wearable terminal.

9. The wearable terminal according to claim 8, wherein the attribute is data capacity, and
the computer program causes the processor to execute operations including:

allowing the second communicator to transmit the specific information to the another wearable terminal when the data capacity of the specific information is equal to or larger than a predetermined value, and allowing the first communicator to transmit the specific information to the another wearable terminal when the data capacity of the specific information is smaller than the predetermined value.

10. The wearable terminal according to claim 8, wherein the attribute is a data classification, and the computer program causes the processor to execute operations including:

allowing the second communicator to transmit the specific information to the another wearable terminal when the data classification of the specific information is image data, voice data, or moving image data, and allowing the first communicator to transmit the specific information to the another wearable terminal when the data classification of the specific information is account data, profile data, or text data.

11. The wearable terminal according to claim 1, wherein the computer program causes the processor to execute operations including:

storing information associated with each of the plurality of programs and transmission propriety of the information, as the specific information, and transmitting the specific information, the specific information being stored as transmittable information, to the another wearable terminal.

12. The wearable terminal according to claim 1, wherein the specific information is at least one of account data, profile data, text data, image data, voice data, and moving image data.

13. The wearable terminal according to claim 1, further comprising:

a sensor which detects a first action with respect to the wearable terminal, wherein the computer program causes the processor to execute operations including:

receiving second action information representing a second action with respect to the another wearable terminal, and authenticating the another wearable terminal upon a determination that the second action, represented by the second action information received and the first action detected by the sensor, are identical actions.

14. The wearable terminal according to claim 1, further comprising:

a first communicator that communicates with the another wearable terminal by human body communication, the human body communication being communication using a human body as a communication medium; and a second communicator that communicates with the another wearable terminal by radio communication performed without an intermediary of the human body;

wherein the computer program causes the processor to execute operations further including:

switching between the first communicator and the second communicator based on an attribute of the specific information, and allowing the switched one of the first communicator and the second communicator to transmit the specific information to the another wearable terminal.

15. A communication method causing a processor included in a wearable terminal to execute operations comprising:

authenticating another wearable terminal which is distinct from the wearable terminal;

receiving another terminal program information representing at least one program stored in the another wearable terminal, from the another wearable terminal when the another wearable terminal is authenticated;

determining whether the at least one program, which is represented by the another terminal program information, is or is not identical to each of the plurality of programs stored in the wearable terminal, displaying an image, on a display screen, the image corresponding to one of the plurality of programs stored in the wearable terminal which is identical to the at least one program stored in the another wearable terminal when the at least one program stored in the another wearable terminal is determined to be identical to the one of the plurality of programs stored in the wearable terminal, the image being used for starting the one of the plurality of programs in response to receipt of an operation with respect to the image which is displayed on the display screen; and when an operation with respect to the image is received, starting the one of the plurality of programs corresponding to the image which receives the operation and transmitting specific information associated with the one of the plurality of programs to the another wearable terminal.

16. The communication method according to claim 15, communicating, via a human body, with the another wearable terminal by human body communication, the human body communication being communication using a human body as a communication medium, via a body connector;

communicating, via radio, with the another wearable terminal by radio communication performed without an intermediary of the body connector, and authenticating the another wearable terminal when connection with the another wearable terminal through the human body communication is established by the communicating via a human body.

17. The communication method according to claim 16, switching between the communicating via a human body and communicating via radio based on an attribute of the specific information and allowing the switched one of the communication via a human body and communication via radio to transmit the specific information to the another wearable terminal.

18. A non-transitory recording medium having a computer program stored thereon, the computer program causing a processor, included in a wearable terminal, to execute operations including:

authenticating another wearable terminal which is distinct from the wearable terminal;

receiving another terminal program information representing at least one program stored in the another wearable terminal, from the another wearable terminal when the another wearable terminal is authenticated;

determining whether the at least one program, which is represented by the another terminal program information, is or is not identical to each of the plurality of programs stored in the wearable terminal, displaying an image, on a display screen, the image corresponding to one of the plurality of programs stored in the wearable terminal which is identical to the at least one program stored in the another wearable terminal when the at least one program stored in the another wearable terminal is determined to be identical to the one of the plurality of programs stored in the wearable terminal, the image being used for starting the one of the plurality of programs in response to an operation performed with respect to the image which is displayed on the display screen; and when an operation with respect to the image is received, starting the one of the plurality of programs corresponding to the image which receives the operation and transmitting specific information associated with the one of the plurality of programs to the another wearable terminal.

19. The non-transitory recording medium according to claim 18, communicating, via a human body, with the another wearable terminal by human body communication, the human body communication being communication using a human body as a communication medium, via a body connector;

communicating via radio with the another wearable terminal by radio communication performed without an intermediary of the body connector, and authenticating the another wearable terminal when connection with the another wearable terminal through the human body communication is established by the communicating via a human body.

20. A non-transitory recording medium according to claim 19, switching between the communicating via a human body and the communicating via radio based on an attribute of the specific information and allowing the switched one of the communicating via a human body and the communicating via radio to transmit the specific information to the another wearable terminal.

\* \* \* \* \*